(12) United States Patent
Kiko et al.

(10) Patent No.: US 7,400,239 B2
(45) Date of Patent: Jul. 15, 2008

(54) UNIVERSAL CONTROL APPARATUS AND METHODS

(75) Inventors: Frederick J. Kiko, Carlsbad, CA (US); David Beene, Oceanside, CA (US)

(73) Assignee: Simply Automated, Incorporated, Carlsbad, CA (US)

( * ) Notice: Subject to any disclaimer, the term of this patent is extended or adjusted under 35 U.S.C. 154(b) by 217 days.

(21) Appl. No.: 11/218,899

(22) Filed: Sep. 2, 2005

(65) Prior Publication Data

US 2006/0065510 A1    Mar. 30, 2006

Related U.S. Application Data

(60) Provisional application No. 60/607,148, filed on Sep. 3, 2004.

(51) Int. Cl.
G08B 23/00 (2006.01)
H01H 13/70 (2006.01)
G05B 11/01 (2006.01)

(52) U.S. Cl. .................. 340/501; 340/525; 340/815.17; 340/310.18; 700/17; 307/112; 307/139; 361/632; 361/709; 361/728; 439/106; 200/1 R; 200/297

(58) Field of Classification Search ................. 340/501, 340/525
See application file for complete search history.

(56) References Cited

U.S. PATENT DOCUMENTS

| | | | |
|---|---|---|---|
| 5,007,860 A | 4/1991 | Robinson et al. | |
| 5,086,385 A | 2/1992 | Launey et al. | |
| 5,106,325 A | 4/1992 | Robinson et al. | |
| 5,229,925 A | 7/1993 | Spencer et al. | |
| 5,290,175 A | 3/1994 | Robinson et al. | |
| 5,471,190 A | 11/1995 | Zimmermann | |
| 5,706,191 A | 1/1998 | Bassett et al. | |
| 5,802,171 A | 9/1998 | Deutsch | |
| 5,883,568 A | 3/1999 | Boyden | |
| 5,898,130 A | 4/1999 | Tansi et al. | |
| 6,058,013 A | 5/2000 | Christopher et al. | |
| 6,140,987 A | 10/2000 | Stein et al. | |
| 6,229,433 B1 | 5/2001 | Rye et al. | |
| 6,380,866 B1 | 4/2002 | Sizer, II et al. | |
| 6,388,399 B1 | 5/2002 | Eckel et al. | |
| 6,608,253 B1 | 8/2003 | Rintz | |
| 6,653,933 B2 | 11/2003 | Raschke et al. | |
| 6,660,948 B2 | 12/2003 | Clegg et al. | |
| 6,697,757 B2 | 2/2004 | Eckel et al. | |
| 6,700,333 B1 | 3/2004 | Hirshi et al. | |
| 6,734,784 B1 | 5/2004 | Lester | |
| 6,750,407 B2 | 6/2004 | Song et al. | |
| 6,798,341 B1 | 9/2004 | Eckel et al. | |
| 6,919,792 B1 | 7/2005 | Battini et al. | |
| 6,922,598 B2 | 7/2005 | Lim et al. | |
| 2004/0046454 A1 | 3/2004 | Kang | |

(Continued)

*Primary Examiner*—Donnie L. Crosland
(74) *Attorney, Agent, or Firm*—Gazdzinski & Associates

(57) ABSTRACT

Apparatus and methods for control of one or more functions within a premises. In one embodiment, the control apparatus comprises a "universal" electronic switch which can be configured according to any number of different desired functional and/or aesthetic schemes. The apparatus uses removable and replaceable control elements which are purely mechanical in nature, thereby allowing consolidation of all electrical functions within the parent control module. An improved control circuit including thermal overload protection is also disclosed, as are methods of operating and manufacturing the apparatus.

46 Claims, 26 Drawing Sheets

U.S. PATENT DOCUMENTS

| | | | | | |
|---|---|---|---|---|---|
| 2004/0054747 A1 | 3/2004 | Breh et al. | 2005/0145468 A1 | 7/2005 | Kim |
| 2005/0125083 A1 | 6/2005 | Kiko | 2005/0154496 A1 | 7/2005 | Chapman et al. |
| | | | 2005/0162273 A1 | 7/2005 | Yoon et al. |

A = SINGEL ROCKER AND DUAL ROCKER

B = MULTI-BUTTON / ROCKER WITH SINGLE OUTPUT

C = QUAD-BUTTON / ROCKER WITH QUAD OUTPUT

D = SENSOR PACKAGE WITH DUAL BUTTONS / ROCKERS (OR DUAL ROCKERS)

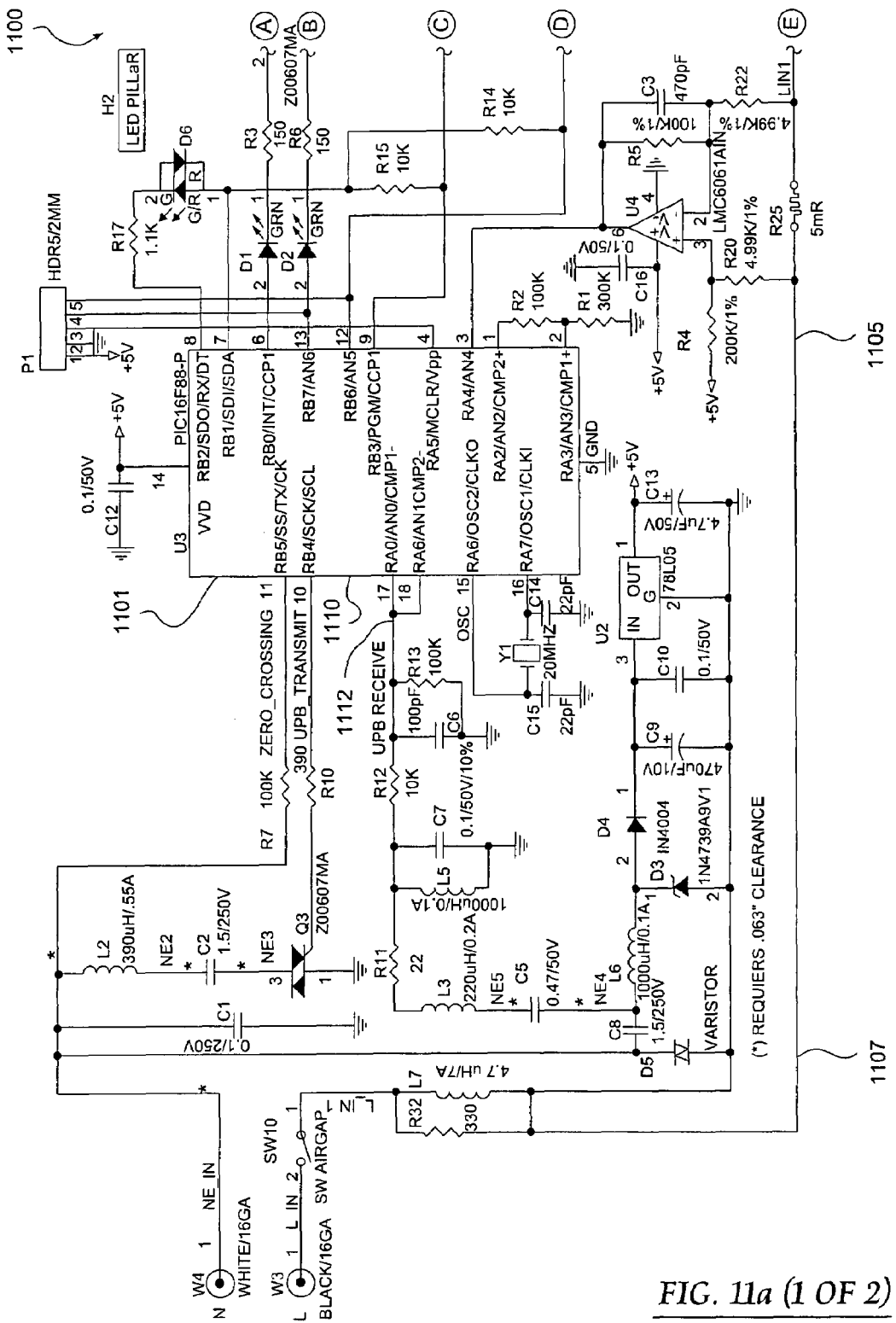
FIG. 11a (1 OF 2)

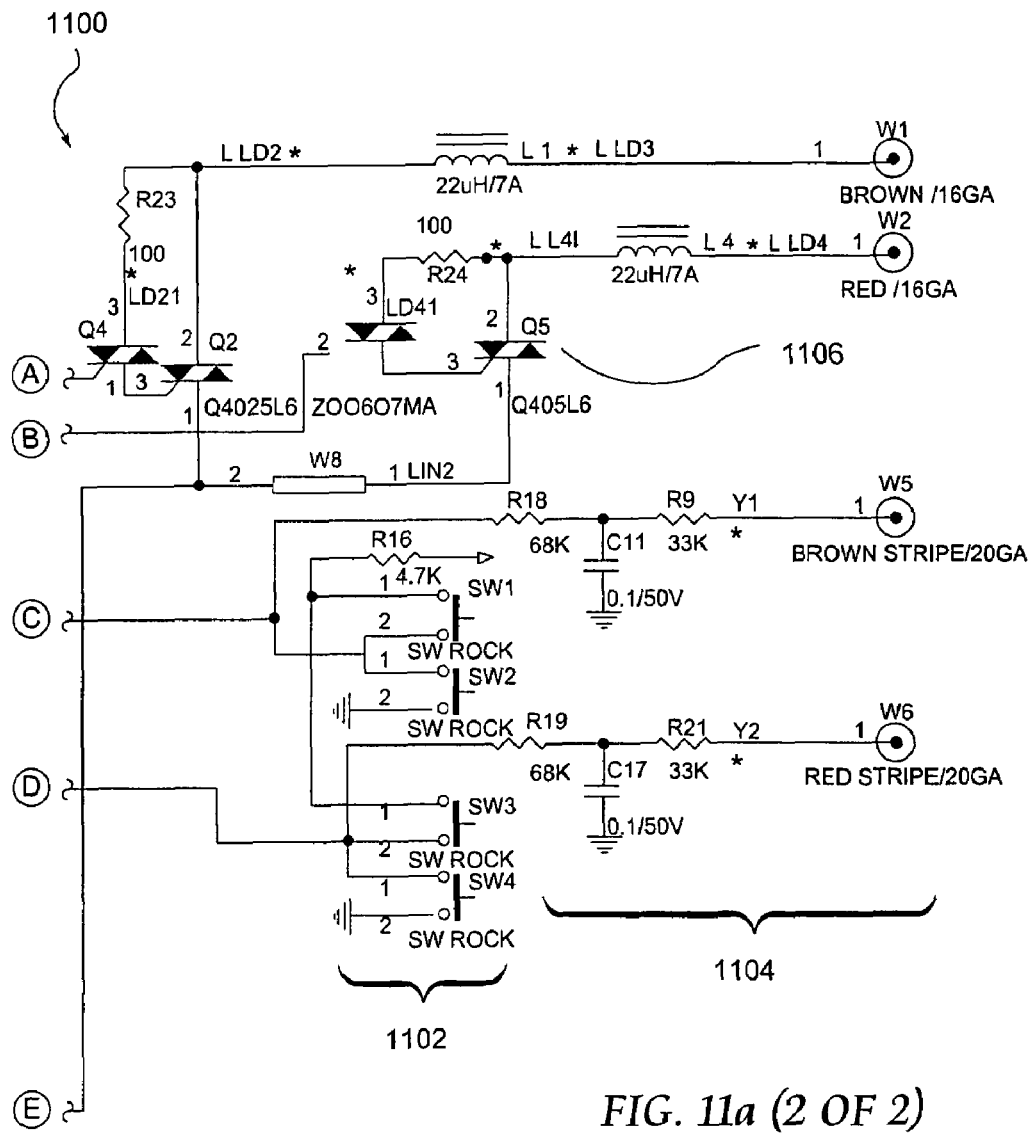
FIG. 11a (2 OF 2)

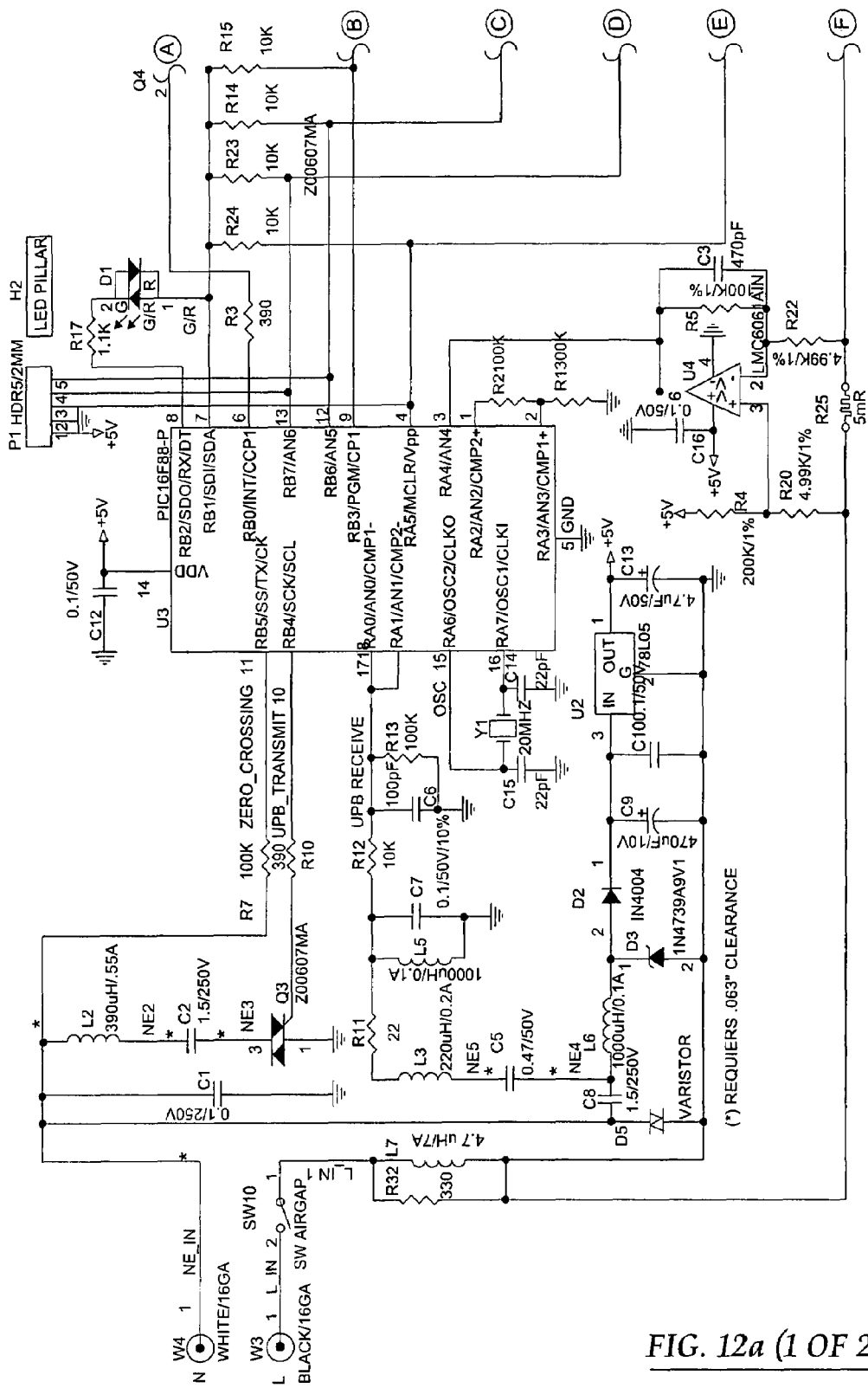
FIG. 12a (1 OF 2)

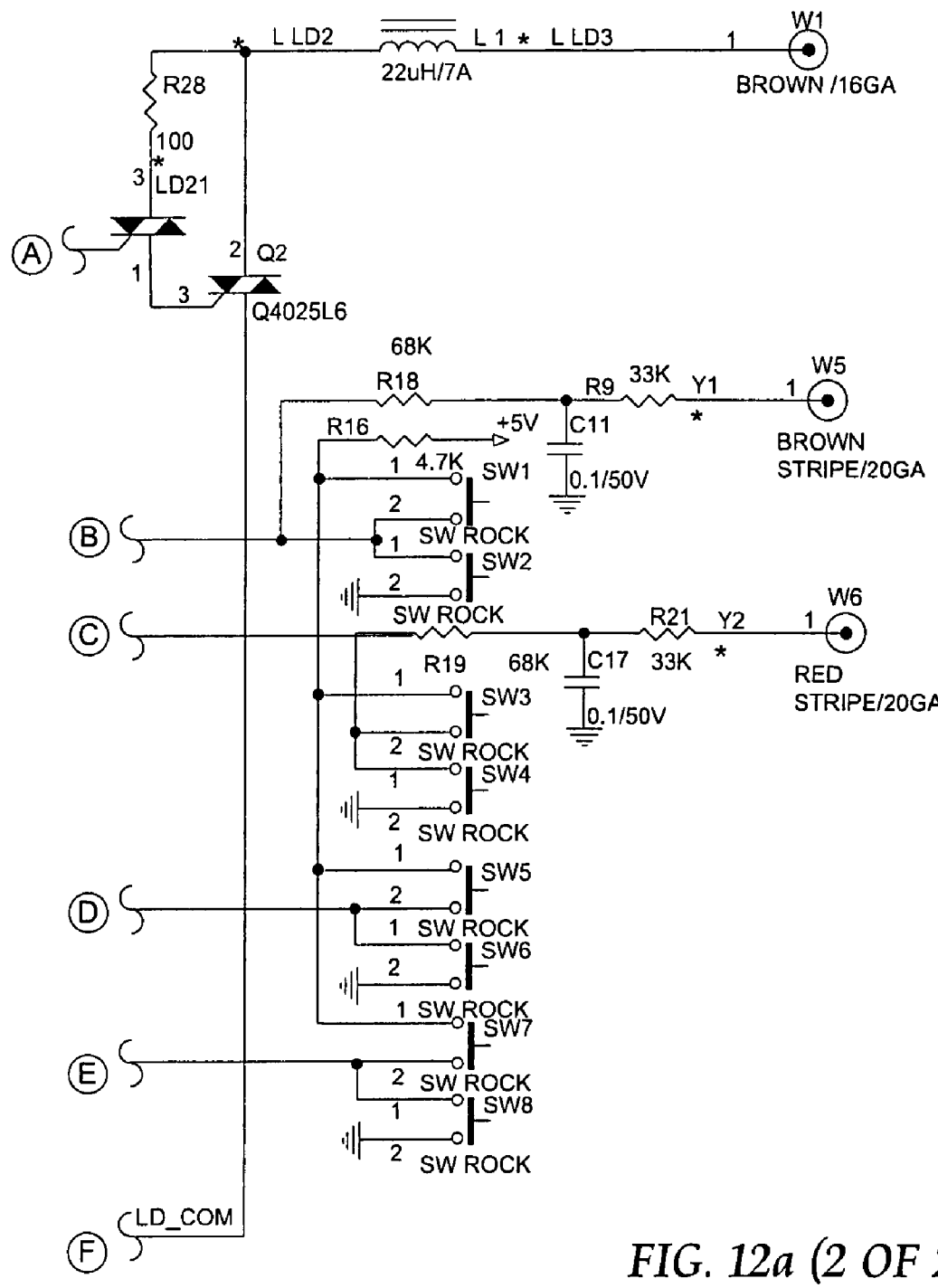
FIG. 12a (2 OF 2)

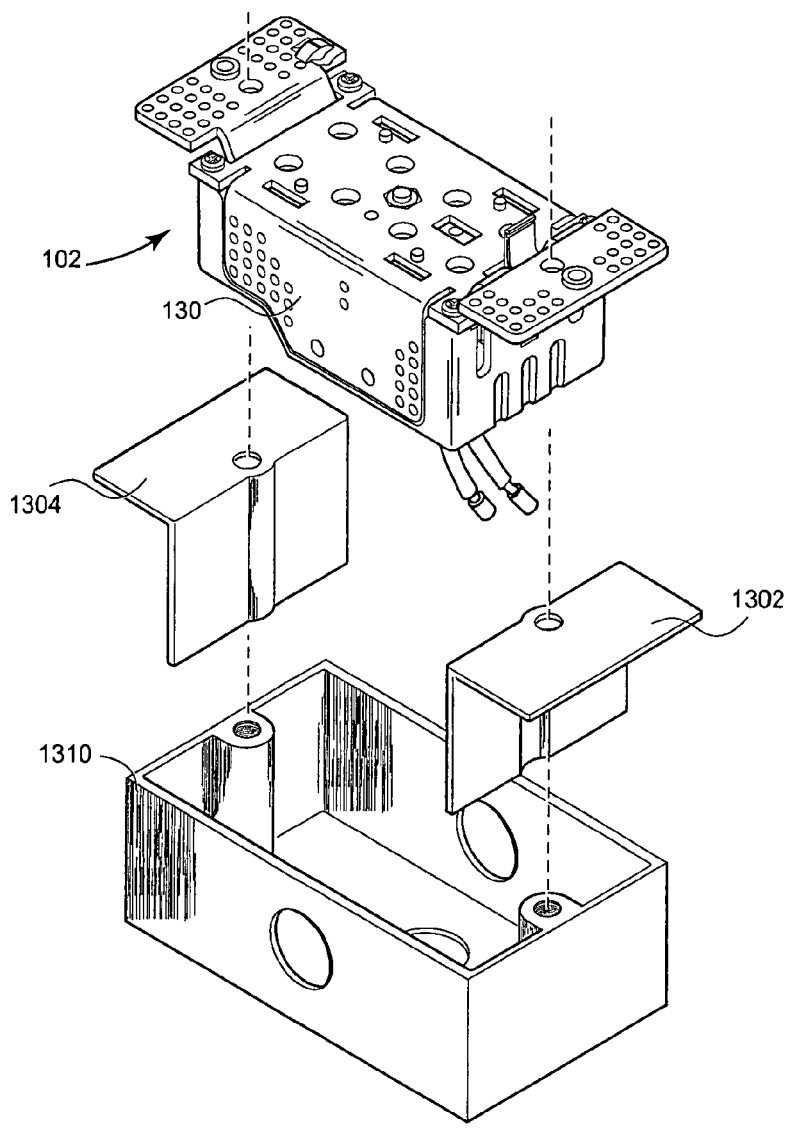

| GANGING AND DERATING CHART: | | | |
|---|---|---|---|
| CONTROL TYPE | MAXIMUM CAPACITY | | |
| | FULL CAPACITY | DERATED CAPACITIES | |
| | NO FINS / SIDE SECTIONS REMOVED | ONE FIN / SIDE SECTION REMOVED FROM EACH CONTROL | TWO FINS / SIDE SECTIONS REMOVED FROM CENTER CONTROL |
| DIMMERS | | | |
| INCANDESCENT [2] | 600W<br>1000W | 500W<br>800W | 400W<br>650W |
| DUAL SLIDE DIMMERS | 300W / 300W | 250W / 250W | 200W / 200W |
| ELECTRONIC LOW VOLTAGE | 300W<br>600W | 250W<br>500W | 200W<br>400W |
| MAGNETIC LOW VOLTAGE | 600VA (450W)<br>1000VA (800W) | 500VA (375W)<br>800VA (650W) | 400VA (300W)<br>650VA (500W) |

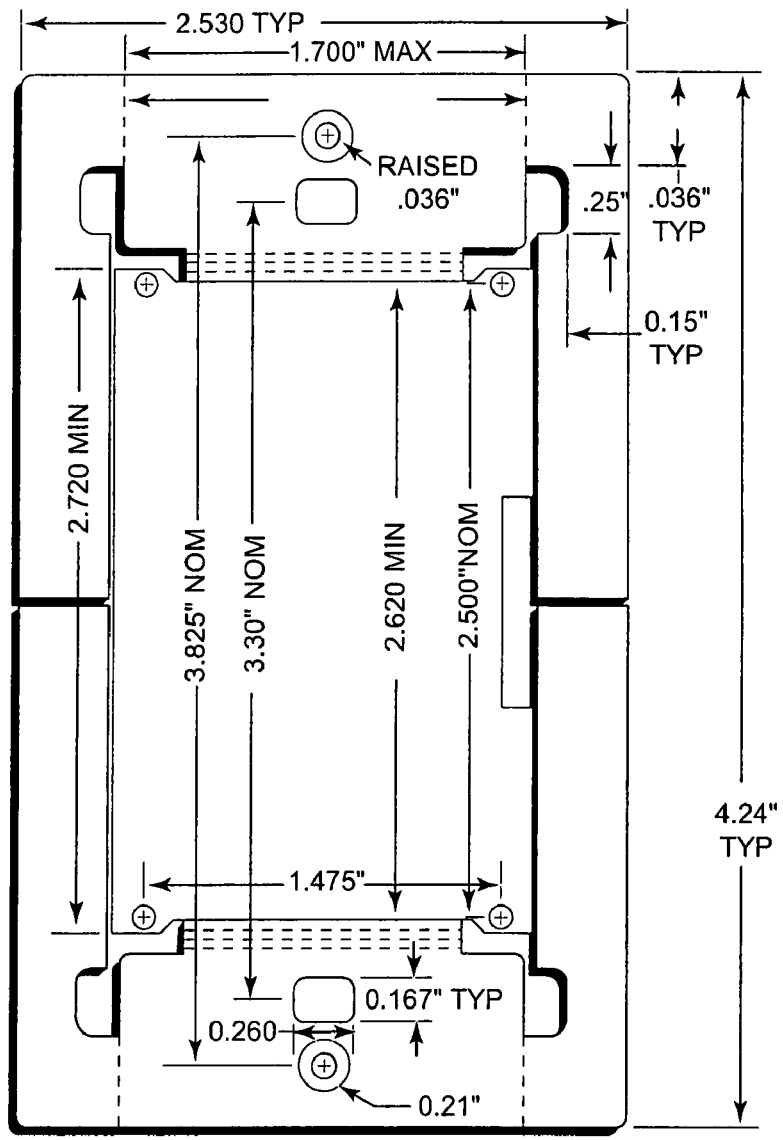
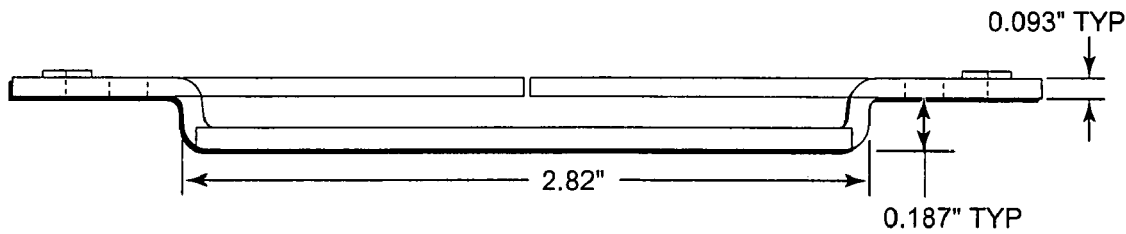
*FIG. 16e*

UNIVERSAL CONTROL APPARATUS AND METHODS

PRIORITY

This application claims priority to U.S. Provisional Application Ser. No. 60/607,148 filed Sep. 3, 2004 entitled "UNIVERSAL CONTROL APPARATUS AND METHODS", incorporated herein by reference in its entirety.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to the field of electrical circuits and related apparatus, and specifically to apparatus and methods useful in controlling one or more functions or operations of equipment such as might be used in a home, office, or other premises.

2. Description of the Related Technology

A variety of different mechanisms for the control of premises lighting and other functions/appliances are known in the art. Various types of wall "toggle" or dimmer switches are ubiquitous throughout such premises. However, a salient disability of these prior art devices relates to their single-purpose configuration; i.e., such devices are generally made to perform a predetermined function, and their design and construction is determined accordingly so as to minimize the cost of manufacturing. For example, a simple wall light switch is configured to switch a light fixture or other such appliance, and the mechanical and electrical portions of the switch are designed to support only this function, with their components being arranged in an integrated (i.e., non-separable) fashion. No changes to the function or configuration of the switch can be made (especially by the consumer), short of a wholesale replacement or swapping-out of the switch assembly.

Some prior art approaches (described in greater detail below) do permit changing of face plates so as to allow the consumer to, inter alia, coordinate the appearance and color of the apparatus to the prevailing decor; however, this capability is purely directed to limited aspects of the aesthetic features and not any underlying function of the apparatus. Furthermore, changing just the faceplate of a switch or other such control apparatus does not address the aesthetics of the switch rocker or switch actuator itself; i.e., the consumer is still restricted to the color/appearance/style of the existing rocker or switch actuator, unless they desire to replace the switch assembly as a whole, which typically requires the services of skilled electrician as well as the purchase of a new assembly.

Furthermore, a plurality of different configurations requiring different tooling and assembly, components, etc., is required under the prior art. For example, such prior art approaches require the manufacturing and control of inventory on multiple different configurations of control element in multiple different colors, thereby creating a matrix of many different combinations. One can readily appreciate the burden this imposes on manufacturing (e.g., many sets of molds, polymer formulations for different colors) and distribution (many SKUs or inventory numbers to keep track of and stock/price).

Another deficiency of the prior art relates to the lack of adaptability of "intelligent" premises control devices such as wall mounted electronic controllers. Normally, such controllers are pre-programmed and installed by a technician, and control various appliance and other functions within the premises based on user- or technician-entered programming. A simple example of such a device is a programmable thermostat. While these types of devices vary greatly in terms of functionality and level of sophistication, all generally suffer from the disability of not being able to be configured or aesthetically adapted to their surrounding environs. Other than perhaps being able to change a faceplate, these devices are not designed to permit easy user-based customization of their aesthetic facets (e.g., appearance and/or sound). For example, the display and menu structures are generally fixed, as is the color, shape, etc. of the mechanical portions of the device. Furthermore, the functions of the device are generally determined at time of manufacture and installation, and hence the addition or substitution of new or different functions is not permitted. Control of such functions via a PC or other such device, while allowing much greater flexibility and programmability, is unwieldy and inconvenient, since the user must access the requisite functions via the PC which may or may not be local to the area from which they desire to control the function in question.

Yet another deficiency with prior art premises control devices relates to their lack of self-protection against improper installation. In many cases, consumers (and even skilled electricians) will install or operate such devices in a manner which causes one or more of the electrical ratings of the device to be exceeded, thereby resulting in a thermal overload condition. For example, the consumer may simply put too high of a wattage (watts=J/s) rating bulb in the controlled circuit's fixture, thereby drawing too much current (P=IV). This can lead to electrical and/or mechanical component failure, including even melting the polymer portions of the switch or controller due to the excessive current draw (and hence heat generation) for which the device was not designed. Such prior art devices generally have no indigenous mechanism for either identifying such overload conditions, or mitigating them before damage (or even fire) is caused.

A variety of different approaches to premises function and appliance control are evidenced in the prior art. For example, U.S. Patent Application Publication No. 20050162273 to Yoon, et al. published Jul. 28, 2005 and entitled "Apparatus and method for remotely controlling household appliances" discloses an apparatus and method for remotely controlling household appliances connected to a home network. A power line and a network processor are installed in each household appliance, enabling a household appliance user to remotely control the appliances from a place outside of as well as inside a home. Information about all conditions of the household appliances can be displayed on a screen displayable household appliance so that the user can recognize the operations of the appliances even during spare moments. A low-price built-in server is installed in each household appliance to assign the corresponding appliance a unique IP address simply over the Internet to be controlled according to an external user control command. A home server is connected to each of the household appliances such that the corresponding appliance receives a control command, sent in transit by a user from a mobile terminal.

U.S. Patent Application Publication No. 20050154496 to Chapman, et al. published Jul. 14, 2005 and entitled "Appliance diagnostic display apparatus and network incorporating same" discloses an appliance diagnostic display and interface system providing a centralized user interface for appliance diagnostic information and control of system self-tests is provided. This centralized user interface is provided via an intelligent thermostat that includes an LCD display. The intelligent thermostat interfaces, via wireless or wired communications, with the appliances installed in the home. The intelligent thermostat then generates and displays various user interface screens that allow particular appliances to be selected. Separate appliance specific screens are then generated that allow the user to access the diagnostic information in system test functionality provided by the individual appliance. Soft function keys provided on the intelligent thermostat allow multi-functional access to the features of the invention depending on which screen is currently being displayed.

U.S. Patent Application Publication No. 20050145468 to Kim, published Jul. 7, 2005 and entitled "Control panel assembly and method for controlling thereof" discloses a control panel assembly for making it easy to manipulate buttons of home appliances, the control panel including at least one LED connected to a circuit board for selectively emitting light, a switch connected to the circuit board and provided adjacent to the LED for controlling a home appliance, a control panel provided in front of the LED and having at least one first hole, and at least one elastic button coupled with an edge of the first hole for selectively coming into contact with the switch in response to a user pressing the button, the elastic button having a pushing member including a first light-transmitting part for transmitting there through light emitted from the LED.

U.S. Patent Application Publication No. 20040054747 to Breh, et al. published Mar. 18, 2004 and entitled "Pervasive home network appliance" discloses a Pervasive Home Network Appliance (appliance) for controlling of home devices in a home network, whereby such appliance may also be accessed automatically or via an additional interface, such as by a cellular (mobile) phone or an Internet browser. The pervasive home network appliance may be implemented by a method and an appliance for facilitating communication between a user interface and one or more external devices. The appliance comprises at least one control adapter for transforming a particular communication protocol to be established between the user interface and at least one of the control adapters, one or more device adapters for transforming a particular communication protocol to be established between one of the external devices and the respective one of the device adapters and a routing engine for routing messages being produced by one of the control adapters to the appropriate one of the device adapters.

U.S. Patent Application Publication No. 20040046454 to Kang, published Mar. 11, 2004 and entitled "Complex home appliance and method of controlling and installing the same" discloses a complex home appliance and a method of controlling and installing the same. The complex home appliance includes a single power supply unit shared by two or more component home appliances of the complex home appliance. The two or more component home appliances are controlled by a single control unit of the complex home appliance. The complex home appliance can be operated in a simultaneous operation mode in which the two or more component home appliances are simultaneously operable, and an individual operation mode in which only one of the two or more component home appliances is operable. The complex home appliance includes a mode-setting unit to set the simultaneous or individual operation mode. The complex home appliance includes a power cut-off unit which supplies power to the single power supply unit and cuts off the supply of the power in response to being electrically opened at the time of an electrical overload.

U.S. Pat. No. 6,922,598 to Lim, et al. issued Jul. 26, 2005 and entitled "System and method for transferring home appliance control data" discloses a system and method for transferring home appliance control data, wherein a control data provision server stores a plurality of data for control of a home appliance and a unified Java application for execution of the plurality of control data. The control data provision server stores the same number of Java applications as that of a plurality of Java virtual machines contained respectively in a plurality of Java phones, resulting in no necessity for each Java phone to download respective Java applications whenever downloading respective control data. Therefore, the control data provision server can be reduced in capacity and burden thereon, and in turn in construction and maintenance costs.

U.S. Pat. No. 6,919,792 to Battini, et al. issued Jul. 19, 2005 and entitled "Control device and method in a system of household appliances" discloses a method and apparatus for controlling a plurality of appliances in a home network, in which each appliance in the network has an associated descriptor comprising information for controlling the appliance. A control device for controlling the plurality of appliances includes a microprocessor for loading and processing descriptors associated with the appliances and a graphics generator for generating a display of markup language pages or page parts based on the descriptor information. The control device uses descriptors of a plurality of appliances to aggregate appliance control functions of the same type for a plurality of appliances in order to display aggregated functions on a single page.

U.S. Pat. No. 6,798,341 to Eckel, et al. issued Sep. 28, 2004 and entitled "Network based multiple sensor and control device with temperature sensing and control" discloses a multifunction sensor device which provides various transducer functions for performing temperature sensing, humidity sensing, ambient light sensing, motion detection, thermostat functions, switching functions, load switching and dimming functions, displaying actual and set temperature values, displaying time of day values apparatus for putting the device in an on/off or auto mode. Key elements include mounting the diverse sensors or transducers within the same housing that can be mounted to a wall in a flush manner, eliminating the requirement of an air flow channel in the device, thus minimizing any adverse effects on the motion detecting element or sensor. The device can transmit and receive real time data, relative data and actual discrete data in addition to switching and controlling loads locally or remotely.

U.S. Pat. No. 6,750,407 to Song, et al. issued Jun. 15, 2004 entitled "Control panel assembly for home appliances and method for manufacturing the same" discloses a control panel assembly for home appliances devised for a better external appearance and more stable operation is disclosed. The control panel assembly includes a substrate provided with at lest one switch for operating home appliance and at least one display element for displaying the operation state, an external film configured to make it possible for an user to access to the switch and the display element, and a control panel allowing the substrate to be installed therein, the control panel injection-molded to be inserted in the external film and integrated with the external film.

U.S. Pat. No. 6,700,333 to Hirshi, et al. issued Mar. 2, 2004 and entitled "Two-wire appliance power controller" discloses a power level controller and method for an AC electrical appliance that can be implemented in the plug of the appliance, controlling power in response to switch closures on the appliance and/or remotely located switches, or alternatively, may be implemented as a module into which an existing appliance is inserted, thereby providing a retrofit solution for appliance control. By using multifunction switches having steering diodes, multiple commands can be transmitted to the controller, all without the need for additional control wires, since all commands are superimposed on the two conductors that deliver power to the appliance. In addition, the independent control of two polarity sensitivity loads may be implemented. With implementations using integrated circuits, the internal electrostatic discharge diodes within the integrated circuit may be used for the power supply to yield a very low parts count system.

U.S. Pat. No. 6,697,757 to Eckel, et al. issued Feb. 24, 2004 and entitled "Local network based multiple sensor device with electrical load control means and with temperature sensor and heat detector that is exposed to ambient air by diffusion" discloses a multifunction sensor device that acts as a heat detector and performs various transducer functions for temperature sensing, ambient light sensing, motion detection, switching functions, and a mechanism to put the device in an on, off or auto mode. The device operates in diverse environments in which sensors are utilized for energy monitoring and control, end user convenience or HVAC control. Key elements include overcoming the difficulty of mounting diverse sensors or transducers within the same device or housing; permitting these various sensors to exist in a single package mounted to a wall; and eliminating the requirement of an air flow channel, thus minimizing any adverse effects on the motion detecting element or sensor as well as providing built in partial hysteresis. A temperature sensor is exposed neither to the flow of air in a room or area nor in an airflow channel where a chimney effect may occur.

U.S. Pat. No. 6,653,933 to Raschke, et al. issued Nov. 25, 2003 and entitled "Autonomous local area distributed network" discloses an autonomous local area distributed network which provides a peer-to-peer network to connect nodes and devices using low cost and low bandwidth communication techniques, thus allowing the network to share node resources and distribute programming tasks across the different nodes. Home appliances and devices such as refrigerators, televisions, light switches, light fixtures, garage door openers, stereos, and the like may be configured as nodes on the peer-to-peer network. Operational programs, referred to as "sequences," may be distributed across nodes in a network to enable the maximum utilization of available node resources.

U.S. Pat. No. 6,608,253 to Rintz issued Aug. 19, 2003 entitled "Light switch assembly" discloses a light switch cover for use with conventional "rocker" and "toggle" type switches. The cover generally includes a mounting bracket which is attached to the electrical box, along with the switch and a face plate which is attached to the mounting bracket. For "rocker" type switches, the face plate is preferably constructed from a soft material to allow the user to operate the covered "rocker" switch, but can be made of a combination of hard and soft materials. For "toggle" type switches an aperture is provided in the face plate to operate the toggle. Preferably, the outer surface of the face plate is provided with a decorated design or other indicia. The light switch can also be utilized where more than one switch is provided. For multiple "rocker" switches, a diverter bar is provided on the mounting bracket, to absorb pressure being asserted on one "rocker" switch from also transferring to an adjacent "rocker" switch and inadvertently turning "off" or "on" the adjacent "rocker" switch. An inner or sub-frame can be provided to allow for an outer frame of any shape with a standard shaped mounting bracket. This assembly includes an outer frame, a flexible decorative sheet, an inner/sub frame and a mounting bracket. The cover assembly completely covers a switch assembly, while allowing the switch assembly to be operated while covered.

U.S. Pat. No. 6,388,399 to Eckel, et al. issued May 14, 2002 and entitled "Network based electrical control system with distributed sensing and control" discloses an electrical control system including a plurality of electrical devices which communicate over a network and interfaces and works with non-protocol devices and signals that only send/receive an on/off digital signal or send/receive one of numerous analog signals. The devices communicate with one another over a network implemented using different types of media. The system includes the necessary user interfaces, network management system interfaces and displays to provision, administer, operate and maintain the electrical device network. The system is particularly suited for lighting control applications to control the lights and/or other electrical loads within an office, building, room or home by motion detection, ambient light sensing, switching functions, dimming functions, temperature sensing functions and humidity sensing functions. Most devices are equipped to put the device in an ON, OFF, or AUTO mode.

U.S. Pat. No. 6,380,866 to Sizer, II, et al. issued Apr. 30, 2002 and entitled "System and apparatus for controlling an appliance situated within a premises" discloses a system and apparatus for controlling an appliance situated within a premises such as a home or office has a premises controller for receiving and storing appliance control information. The premises controller includes a wireless transmitter for generating and transmitting a packet of appliance control information to an appliance controller based on the stored appliance control information. In one aspect of the invention, the appliance controller is spaced from the premises controller but within range of the generated packet transmission for interfacing with the premises appliance. The appliance controller further includes a packet receiver for receiving the packet of control information. In one aspect of the invention, the premises controller has a microprocessor. An infrared pulse generator is operatively connected to the microprocessor and generates and transmits an infrared pulse code to the appliance.

U.S. Pat. No. 6,229,433 to Rye, et al. issued on May 8, 2001 entitled "Appliance control" discloses an automated appliance control system includes a unit which transmits binary coded address and function control signals along the a.c. power line to a plurality of appliance control modules connected to the power line at various locations in the home. The binary coded signals transmitted along the a.c. power line are in the form of binary rf bursts which occur before and after the a.c. power line zero crossing points.

U.S. Pat. No. 5,898,130 to Tansi, et al. issued Apr. 27, 1999 and entitled "Electrical receptacle cover with modular inserts" discloses a cover for a surface mounted electrical box in which are placed one of a selected group of receptacles each having different electrical plug blade contact arrangements, sizes and shapes. The partial cover has a cut-out and receives therein a selectable modular insert which contains apertures which correspond to the plug prong contacts of the receptacle. The modular insert locks in the cut-out and fits flush with the remainder of the partial cover. Thus, the cover is assembled to match the receptacle within the box.

U.S. Pat. No. 5,706,191 to Bassett, et al. issued Jan. 6, 1998 and entitled "Appliance interface apparatus and automated residence management system" discloses a method for bringing an appliance and/or an electrical or mechanical system of a residence into communication with another, or with a control device within the residence, or with an other communication source outside the residence, so as to establish a home automation system, or enlarge upon an existing automation system. An appliance interface module apparatus is also provided for facilitating communication between an appliance, and the automation system as a whole. The appliance interface module may be capable of controlling, upon command, the specific detailed operations of the appliance to which it is attached, and may, upon inquiry, transmit data which has been recorded, stored and/or calculated by the module.

U.S. Pat. No. 5,471,190 to Zimmermann issued Nov. 28, 1995 and entitled "Method and apparatus for resource allocation in a communication network system" discloses a control communication network system adapted for distributed control and communication between various home electrical appliances in a manner that eliminates the need for a central controller and eliminates or greatly simplifies the manual assignment of addresses, control relationships or other network resources. The system utilizes a process of "hailing" for addresses or resources by newly introduced network devices combined with a process by which declaratory statements are used to convey identification or resource availability information to potential controlling devices. The present invention comprises a lightswitch which can be dynamically "taught" to control or to be controlled by any other similar lightswitch in a given house without special wiring or user intervention other than the toggling of a simple "teach/learn" switch associated with each lightswitch.

U.S. Pat. No. 5,290,175 to Robinson, et al. issued Mar. 1, 1994 and entitled "Modular higher density communications coupling system" discloses a modular higher density communications coupling system including a universal platform for supporting multiple connectors from a single outlet hole is disclosed. The platform includes a main body member having a registration ridge extending forward of the main body member for extending into a standard sized outlet hole. A pair of apertures adjacent to each other extend through the main body member and are generally surrounded by the registration ridge. A pair of connector housings are attachable to the rear of the platform in alignment with the apertures for housing connectors. A pair of retaining members on two sides of the apertures hold the connector housings in position. A pair of support members extend rearwardly from the main body of the platform on the other two sides of the apertures. A termination plate is mounted in the support members, the termination plate having a plurality of electrical couplings for connecting the wire from a wall to the connector. A grounding screw mount provides easy access from the front, side or rear. The relationship between the retaining members, apertures, and support members facilitates a higher density of electrical couplings than previously possible in the prior art. Telecommunications apparatus of the type identified within the specification, in combination with the aforesaid, is contemplated as coming within the scope of the present invention.

U.S. Pat. No. 5,106,325 to Robinson, et al. issued Apr. 21, 1992 and entitled "Modular higher density communications coupling system" discloses a modular higher density communications coupling system including a universal platform for supporting multiple connectors from a single outlet hole. The platform includes a main body member having a registration ridge extending forward of the main body member for extending into a standard sized outlet hole. A pair of apertures adjacent to each other extend through the main body member and are generally surrounded by the registration ridge. A pair of connector housings are attachable to the rear of the platform in alignment with the apertures for housing connectors. A pair of retaining members on two sides of the apertures hold the connector housings in position. A pair of support members extend rearwardly from the main body of the platform on the other two sides of the apertures. A termination plate is mounted in the support members, the termination plate having a plurality of electrical couplings for connecting the wire from a wall to the connector. A grounding screw mount provides easy access from the front, side or rear. The relationship between the retaining members, apertures, and support members facilitates a higher density of electrical couplings than previously possible in the prior art. Telecommunications apparatus of the type identified within the specification, in combination with the aforesaid, is contemplated as coming within the scope of the present invention.

U.S. Pat. No. 5,007,860 to Robinson, et al. issued Apr. 16, 1991 and entitled "Modular higher density communications coupling system" discloses a modular higher density communications coupling system including a universal platform for supporting multiple connectors from a single outlet hole. The platform includes a main body member having a registration ridge extending forward of the main body member for extending into a standard sized outlet hole. A pair of apertures adjacent to each other extend through the main body member and are generally surrounded by the registration ridge. A pair of connector housings are attachable to the rear of the platform in alignment with the apertures for housing connectors. A pair of retaining members on two sides of the apertures hold the connector housings in position. A pair of support members extend rearwardly from the main body of the platform on the other two sides of the apertures. A termination plate is mounted in the support members, the termination plate having a plurality of electrical couplings for connecting the wire from a wall to the connector. A grounding screw mount provides easy access from the front, side or rear. The relationship between the retaining members, apertures, and support members facilitates a higher density of electrical couplings than previously possible in the prior art. Telecommunications apparatus of the type identified within the specification, in combination with the aforesaid, is contemplated as coming within the scope of the present invention.

The "Uni-Base Wall Mounted Controller Body with Scene Control Capability" manufactured by Leviton Manufacturing Co, Inc. comprises a controller body adapted to interface with a plurality of different face plates. Similarly, the "Wall Transmitter Base & Keypad model XPT4" distributed by X-10 comprises a wall transmitter base which includes a controller body adapted to interface with a plurality of different face plates.

Based on the foregoing, there is a salient need for improved premises control apparatus that is (i) highly flexible and adaptable in its configuration, both from a functional and aesthetic perspective, and (ii) very cost effective to manufacture, stock and implement. Such apparatus would ideally allow the consumer to perform most or all of the functional and/or aesthetic changes or modifications they require using commonly available tools or devices, and would also ideally protect itself against improper installation or misuse by the consumer.

SUMMARY OF THE INVENTION

The present invention satisfies the foregoing needs by providing an improved control apparatus for use in, e.g., various types of premises and with various types of equipment or appliances.

In a first aspect of the invention, an improved control apparatus is disclosed. In one exemplary embodiment, the control apparatus comprises a "universal" control apparatus architecture for use in, e.g., residential or office switch, dimmer, indicator/actuator, and sensor applications, which allows for both a great degree of configurability (whether by the end-user, the installer, or the manufacturer) as well as substantial uniformity between the components used for the various configurations. The apparatus comprises a substantially universal module and one or more removable control elements. The module can be adapted to allow selective utilization of various functions (such as one or more switches contained therein) through proper selection of the control element attached thereto.

In a second aspect, an improved control module useful within the foregoing apparatus is disclosed. In one embodiment, the apparatus comprises an electronic device which comprises two or more functions which can be selectively utilized within a given application. The exemplary module comprises a transistorized architecture having electronically controlled switching functions, a mechanically actuated air gap, LED status indications, and thermally optimized power transistor and heat sink arrangement. The module is internally actuated by the associated control element(s), thereby removing all electronic components and switches from the (removable) control elements.

In a third aspect of the invention, an improved removable control element for use within the above-referenced apparatus is disclosed. In one embodiment, the control element comprises a rocker-type actuator having no electronic or electrical components therein (including no switches or related components), thereby providing ultra-low manufacturing cost and complete interchangeability between modules (and applications).

In a fourth aspect of the invention, an improved control apparatus configuration utilizing a display and/or touch-screen element is disclosed. In one embodiment, the display/touch-screen element comprises an LCD unit. The display/touch element not only allows for more sophisticated (e.g., "soft") control and maintenance/testing functions, but also allows for selectively controllable aesthetics. The other components adjacent to the apparatus are selectively replaceable so as to allow for aesthetic coordination.

In a fifth aspect, an improved heat transfer arrangement is disclosed wherein the power transistor(s) or other heat-producing components are disposed in the most thermally efficient location on the control module substrate in order to maximize heat dissipation.

In a sixth aspect of the invention, an improved heat sink arrangement is disclosed wherein little or no deleterious effect on thermal power dissipation is incurred through aggregation of two or more control elements.

In a seventh aspect of the invention, an improved heat sink arrangement is disclosed wherein additional heat dissipation is afforded through the front (outward) face of the control element by virtue of one or more coolant (e.g., air) circulation paths.

In an eighth aspect of the invention, an improved multi-function control apparatus is disclosed. In one embodiment, the apparatus has a plurality of removable and replaceable buttons or actuators which can be configured by the end-user or others according to specific functional or aesthetic considerations.

In a ninth aspect of the invention, an improved controller apparatus is disclosed. In one embodiment, the controller apparatus comprises a circuit referenced to the "line" conductor (as opposed to neutral) having a plurality of triacs that can be driven directly by the circuit, thereby obviating the need for devices such as Opto triac driver(s). Current sensing is also advantageously accomplished with a small operational amplifier and a limited number of resistors rather than a large current transformer as in prior art configurations.

In a tenth aspect of the invention, an improved substrate component arrangement is disclosed wherein all of the components on the substrate are disposed on one side (and those requiring actuation being actuated through the substrate itself) so as to, inter alia, permit the use of low cost and rapid wave soldering techniques.

In an eleventh aspect of the invention, an improved method of manufacturing an electronic assembly is disclosed. In one embodiment the method comprises using a bendable or deformable device to allow testing of a circuit board or other assembly before the board is populated. The bendable device is then subsequently bent down into place on the board for assembly.

These and other aspects of the invention will be readily appreciated by those of ordinary skill provided the present disclosure.

BRIEF DESCRIPTION OF THE DRAWINGS

The features, objectives, and advantages of the invention will become more apparent from the detailed description set forth below when taken in conjunction with the drawings, wherein:

FIG. 3b is an exploded perspective view of the removable control element used with the control apparatus of FIG. 3a.

FIG. 4b is an exploded perspective view of the removable control element used with the control apparatus of FIG. 4a.

FIG. 5b is an exploded perspective view of the removable control element used with the control apparatus of FIG. 5a.

FIG. 6b is an exploded perspective view of the removable control element used with the control apparatus of FIG. 6a.

FIG. 7b is an exploded perspective view of the removable control element used with the control apparatus of FIG. 7a.

FIG. 8b is an exploded perspective view of the removable control element used with the control apparatus of FIG. 8a.

FIG. 9b is an exploded perspective view of the removable control element used with the control apparatus of FIG. 9a.

FIG. 10b is an exploded perspective view of the removable control element used with the control apparatus of FIG. 10a.

FIG. 11a is a schematic of one embodiment of the control module (convertible rocker wall switch/dimmer) according to the invention.

FIG. 11b is a top plan view of one embodiment of the internal substrate of the control module of FIG. 11a.

FIG. 12a is a schematic of one embodiment of the control module (multi-button rocker wall switch/dimmer) according to the invention.

FIG. 12b is a top plan view of one embodiment of the internal substrate of the control module of FIG. 12a.

FIG. 13 is an exploded perspective view of an exemplary heat sink configuration according to the invention, showing both control module wrap-around and top/bottom heat sink elements relative to a conventional junction box.

FIG. 14 is a composite view illustrating a prior art breakaway heat sink configuration and associated power ratings.

FIGS. 16c-16f are dimensional arrangement drawings of various components of the control apparatus of FIG. 16a, showing exemplary dimensions associated therewith.

DETAILED DESCRIPTION OF THE PREFERRED EMBODIMENT

Figure 1A:
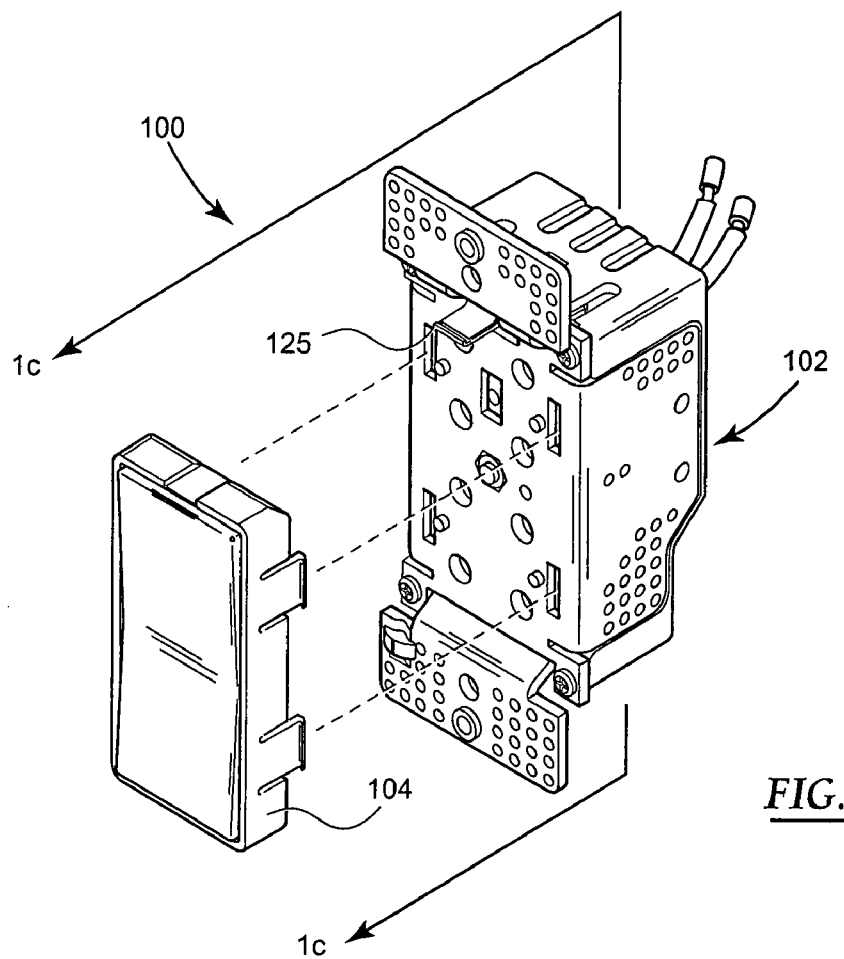
FIG. 1a is a front perspective view of a first embodiment of the control apparatus of the present invention, shown partly disassembled.
Figure 1B:
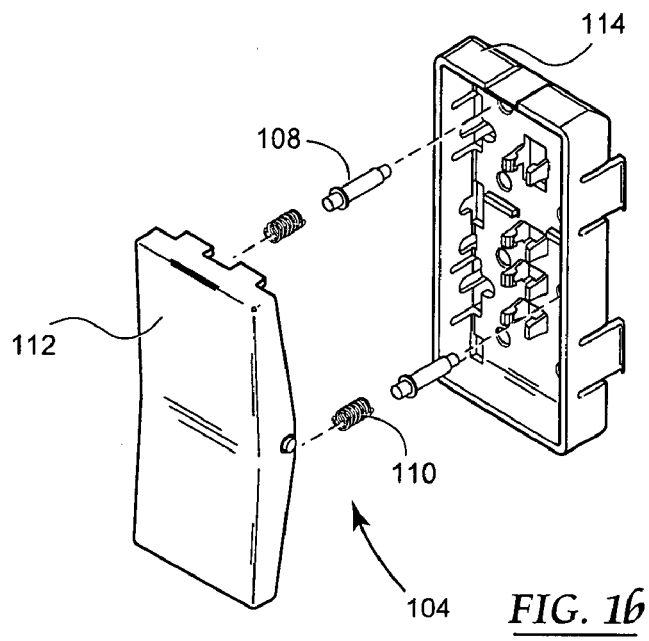
FIG. 1b is an exploded perspective view of the removable control element used with the control apparatus of FIG. 1a (single rocker).

Reference is now made to the drawings wherein like numerals refer to like parts throughout.

As used herein, the term "control apparatus" refers generally to any device or component which allows the control of one or more functions, such as for example lighting. Exemplary control apparatus comprise, without limitation, lighting switches, dimmers, appliance or home remote controls, garage door or front security gate openers or actuators, pool/spa controls, HVAC controls, blind/drape controls, audio/video/data control or connectivity functions (whether wired or wireless), security functions (such as, e.g., camera/sensor position, operation, and alarm functions), electrical power distribution and conservation functions, solar array controls, and satellite antenna position controls and motion sensing monitoring.

As used herein, the term "integrated circuit" shall include any type of integrated device of any function, whether single or multiple die, or small or large scale of integration, and irrespective of process or base materials (including, without limitation Si, SiGe, CMOS and GAs) including without limitation applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs.

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

As used herein, the term "software application" refers generally to a unit of executable software that implements theme-based functionality The themes of applications vary broadly across any number of disciplines and functions (such as address book, notepad, calculator etc.), and one application may have more than one theme. The unit of executable software generally runs in a predetermined environment; for example, the unit could comprise a downloadable Java Xlet™ that runs within the Java™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ (including J2ME, Java Beans, etc.) and the like.

As used herein, the terms "network" and "bearer network" refer generally to any type of telecommunications or data network including, without limitation, data networks (including MANs, WANs, LANs, WLANs, internets, and intranets), hybrid fiber coax (HFC) networks, satellite networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "wireless" includes, but is not limited to, IS-95, CDMA2000, Bluetooth™, IrDA interface, IEEE Std. 802.11(a) or (g), Wireless Application Protocol (WAP), GPRS, GSM, TDMA (e.g., IS-54 or 136), UMTS, third-generation or "3G" systems such as 3GPP and 3GPP2, ultrawideband (UWB) systems such as TM-UWB or 802.15, CSMA/CD-based systems, satellite systems, or any other of myriad data communication systems and protocols well known to those of skill in the communications arts.

As used herein, the term "sensor" includes any time of sensing device or mechanism including, without limitation, infrared sensors (passive or otherwise), light level sensors, photodiodes, motion detectors, temperature sensors, humidity sensors, radiation sensors, antigen detectors, optical sensors, CCD/CMOS cameras, acoustic sensors, and ultrasonic sensors.

As used herein, the terms "client device" and "end user device" include, but are not limited to, personal computers (PCs) and minicomputers, whether desktop, laptop, or otherwise, set-top boxes, personal digital assistants (PDAs) such as the Apple Newton®, "Palm®" family of devices, handheld computers such as the Hitachi "VisionPlate", personal communicators such as the Motorola Accompli devices, Motorola EVR-8401, J2ME equipped devices, cellular telephones, or literally any other device capable of interchanging data with a network.

Additionally, the terms "site", "premises" and "structure" as used herein shall include any location (or group of locations) having one or more functions capable of using one or more aspects of the present invention including, without limitation, residential houses, apartments, trailers, watercraft (e.g., "houseboats" or cruise ships), motor homes, offices, and businesses.

As used herein, the term "aesthetic" refers to any facet, aspect or consideration of or relating to the sensory perception of an object or information including, without limitation, visual appearance, texture, size, shape, weight, temperature, position, taste, aroma/smell, acoustic or electromagnetic emissions, etc. For example, an aesthetic may comprise the color coordination of two or more components. Alternatively, an aesthetic may comprise the texture and feel of surfaces or associated with events (including the feel of mechanisms such as rocker switches being actuated). As another exemplary alternative, an aesthetic may comprise the layout or positioning and/or iconic or graphic representations used on an LCD or other display device, or the font used for lettering. An aesthetic may also comprise the scent associated with something (such as where one or more components are scented or selectively emit scent).

As used herein, the term "display" means any type of device adapted to display information, including without limitation LCDs, TFTs, plasma displays, LEDs, CRTs, FEDs, and fluorescent devices.

As used herein, the term "indicator" refers to any device or mechanism adapted to provide an indication of something, including without limitation LEDs, white light diodes, coherent light sources (e.g., laser diodes), LCDs, incandescent bulbs, and fluorescent bulbs.

As used herein, the term "UPB" or universal powerline bus refers generally to technologies which impose digital or analog signals or pulses onto AC waveforms or DC power delivery systems, such as for example the well known UPB industry standard approach set forth in "Universal Powerline Bus: The UPB System Description", Version 1.1 dated Sep. 19, 2003, incorporated herein by reference in its entirety.

Overview

Existing Home Automation generally involves integrating many different manufacturers' products into a system to try to satisfy a customer's desires. One particularly exemplary approach (and associated components and techniques) is described in co-owned and co-pending U.S. provisional patent application No. 60/519,068 filed Nov. 10, 2003 and entitled "Improved Automation Apparatus and Methods", which is incorporated herein by reference in its entirety. The foregoing approach improves and simplifies the (e.g. home) automation process through a variety of advantageous design features, including: (i) integrating most of the functions within a compact, unitary server; (ii) reducing the complexity and cost of installation of the technology through modular and self-installable components, and use of existing structure wiring to the maximum extent practicable; and (iii) providing a high level of system scalability so that each particular installation can be readily configured to meet the customer's needs at the lowest cost and with the least complexity, while also simultaneously permitting expansion to cover literally every type of function relating to the structure including, e.g., HVAC/environmental control, security, entertainment, energy conservation and management, and safety.

However, there is still a need for improved control apparatus (such as for example light switches, sensors, appliance controls, etc.) and methods which allow for flexible, efficient and control of one or more functions and/or aesthetics within the premises (or in associated structures or areas) at a low cost. The present invention satisfies these needs by providing, inter alia, a "universal" control apparatus architecture which allows for both a great degree of configurability (whether by the end-user, the installer, or the manufacturer) as well as substantial uniformity between the components used for the various configurations. This latter feature is particularly advantageous in terms of manufacturing and distribution of the apparatus, since only one or a very limited number of separate apparatus components that can be configured a multitude of different ways can be maintained in inventory, thereby greatly simplifying manufacturing, inventory control and distribution. In one embodiment, the architecture comprises a separable control element (e.g., rocker switch, dimmer, etc.) and associated "base" control module to which it is removably attached. The module provides various control functions which are actuated via one or more of the control elements.

The aforementioned architecture also removes all electrical and electronic components from the control elements, thereby reducing their cost (and accordingly making their replacement much less costly than the prior art approaches).

In another aspect of the invention, an improved control apparatus configuration utilizing a display and/or touch-screen element is disclosed. The display/touch element not only allows for more sophisticated (e.g., "soft") control and maintenance/testing functions, but also allows for selectively controllable aesthetics. The other components adjacent to the apparatus are selectively replaceable so as to allow for aesthetic coordination.

In another aspect of the invention, an improved heat sink arrangement is disclosed wherein little or no deleterious effect on thermal power dissipation is incurred through aggregation of two or more control elements.

In another aspect of the invention, an improved heat sink arrangement is disclosed wherein the power transistor(s) or other heat-producing components are disposed in the most thermally efficient location on the substrate in order to maximize heat dissipation.

In another aspect of the invention, an improved heat sink arrangement is disclosed wherein additional heat dissipation is afforded through the front (outward) face of the control element by virtue of one or more coolant (e.g., air) circulation paths.

In another aspect of the invention, an improved multi-function control apparatus is disclosed. In one embodiment, the apparatus has a plurality of removable and replaceable buttons or actuators which can be configured by the end-user or others according to specific aesthetic considerations.

In another aspect of the invention, an improved controller apparatus referenced to a line conductor is disclosed. In one embodiment, the controller apparatus comprises a circuit having a plurality of triacs that can be driven directly by the circuit, thereby obviating the need for Opto triac driver(s). Current sensing is also advantageously accomplished with a small operational amplifier and a limited number of resistors rather than a large current transformer as in prior art configurations.

In another aspect of the invention, an improved substrate component arrangement is disclosed wherein all of the components on the substrate are disposed on one side (and those requiring actuation being actuated through the substrate itself) so as to, inter alia, permit the use of low cost and rapid wave soldering techniques.

In another aspect of the invention, an improved method of manufacturing an electronic assembly is disclosed. In one embodiment the method comprises using a bendable or deformable device to allow testing of a circuit board or other assembly before the board is populated. The bendable device is then subsequently bent down into place on the board for assembly.

Control Apparatus

Referring now to FIGS. 1a-1d, a first exemplary embodiment of a control apparatus according to the present invention is described in detail.

It will be recognized that while one primary aspect of the control apparatus of FIGS. 1a-1d relates to its modular and "universal" construction as described subsequently herein, the various aspects of the invention may be employed either alone or in combination with one or more other aspects of the invention to achieve the desired result. Hence, advantageously, the control apparatus is inter alia (i) inherently modular, (ii) completely scalable, (iii) configurable with numerous different combinations of features and options.

It will further be recognized that while the terms "home", "premises" and "consumer" may be used herein in association with one or more aspects and exemplary embodiments of the invention, the invention is in no way limited to such applications. The various aspects of the present invention may be applied with equal success in, inter alia, small or large business (e.g., so-called "enterprise" systems), industrial, and even military applications if desired.

It is also noted that any references to directions (e.g., top, upper, upward, laterally, vertical, etc.) are purely relative, and should in no way be constraining unless otherwise specifically indicated.

FIG. 1a is a front perspective view of a first embodiment of the control apparatus of the present invention, shown partly disassembled. As shown in FIG. 1a, the apparatus 100 comprises a control module 102 and a control element 104 (see FIG. 1b) removably mated thereto. A key feature of the control module and element arrangement of FIG. 1a is the fact that the control element 104 contains no electronics or electrical components of any kind, as compared to the prior art. Rather, the element 104 contains purely mechanical components as shown (including return springs 110, plunger elements 108, and the control rocker 112 itself, all disposed within the element housing 114. Herein lies a salient advantage of the present invention. This approach not only makes the removable element 104 lower in cost to manufacture, but also aids in its removability (and hence interchangeability) as will be described in greater detail below. The element 104 in the illustrated embodiment merely snaps into and out of the module 102, although it will be appreciated that any number of different approaches to making the element 104 selectively removable from the module 102 may be used, such as for example friction or interference pins, U-clips, or even magnets. Myriad such alternatives will be recognized by those of ordinary skill provided the present disclosure.

In the exemplary embodiment, the rocker 112, housing 114 and plunger elements 108 are all injection molded from a low-cost plastic (e.g. ABS meeting UL94V-0 safety requirements), although other processes (such as for example transfer molding) and materials (such as for example other non-conductive polymers) may be used with equal success.

In the illustrated embodiment, the control element 104 (as well as the module 102) is made according to a predetermined size and configuration, such that similar or differently configured control elements 104 and modules 102 may be mated together. As a simple example, an end user may wish to change the color of the control element 104 for a certain aesthetic quality (e.g., to match the wallpaper). Rather than have to obtain a custom or unique element 104 for each different fixture in the room (or perhaps through several rooms), a largely "one size fits all" approach is used such that an identical control element 104 will fit on every instantiation of the module 102 if desired. Hence, the module/control element arrangement of the illustrated embodiment is substantially "universal".

While having the foregoing benefits for the end-user or installer, the benefits of this approach to the manufacturer and distributor are equally significant. Specifically, rather than make a plurality of different configurations requiring different tooling and assembly, components, etc., the variance between different modules 102 and control elements 104 for different applications is greatly minimized. For example, rather than having to manufacture and control inventory on three different configurations of control element 104 in e.g., five different colors (thereby creating a matrix of 3×5=15 different combinations), the manufacturer/distributor can merely produce and inventory five (5) components, corresponding to the five different colors, since each is "universal" within all three applications. One can readily appreciate the reduced burden this imposes on manufacturing (e.g., only one set of molds versus three) and distribution (only five versus fifteen SKUs or inventory numbers to keep track of and stock/price). Myriad other benefits accruing from the "universal" and highly modular approach of the present invention will be apparent to those of ordinary skill in the manufacturing and retail/wholesale distribution arts provided the present disclosure, the foregoing being merely exemplary.

It will also be recognized that one or more features of the module 102 may be standardized or made "universal" in addition to the mating portions needed to receive the control element 104. For example, the overall form factor of the module (height, depth, width, etc.) can be made uniform or standard. Additionally, the internals of the module (see FIG. 1d) can be partly or completely universalized such that different types of control elements 104 can be accommodated within one type or configuration of control module 102. For example, a given control module 102 can be configured to accept a plurality of types of elements 104 such as one comprising a rocker switch, one comprising a pushbutton, one comprising an indicator (e.g., LED), etc. Hence, the control module is multi-functioned, and the user/installer merely selects the functions to be utilized by installing the appropriate control element(s) 104. In a simple variant, the multiple functions merely comprise multiple instantiations of the same or a homogeneous function (e.g., the ability to accept 1, 2, or 4 rocker switches). In another variant, the functions comprise heterogeneous functions which may or may not be related to one another (e.g., "ganged")

Figure 1C:
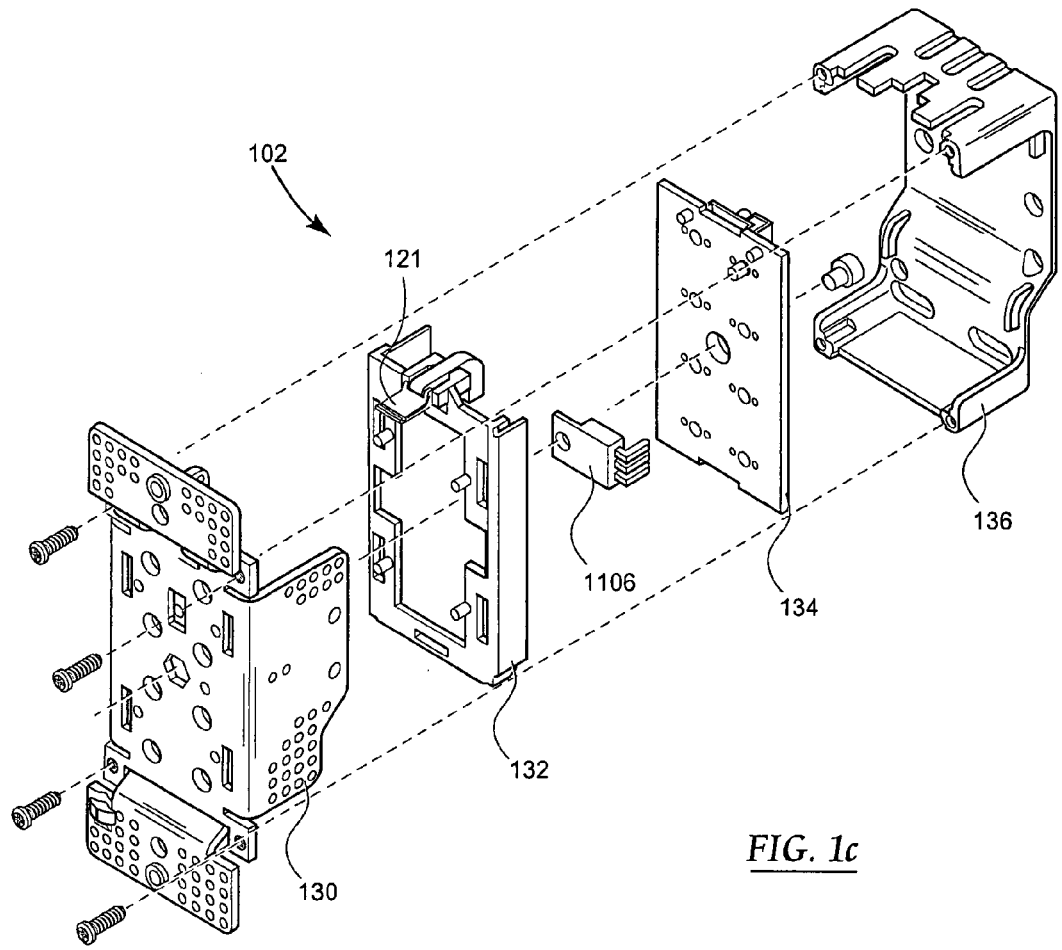
FIG. 1c is an exploded perspective view of the control module of FIG. 1a FIG. 1d is a side cross-sectional view of the module and element of FIG. 1a (assembled) taken along line 1c-1c, showing the various constituent components.

FIG. 1c is an exploded perspective view of the control module 102 of FIG. 1a, showing the various components. As illustrated in FIG. 1c, the module 102 generally comprises a heat sink element 130, first housing element 132, substrate 134 (described in detail below with respect to FIG. 11), and second housing element 136. The heat sink comprises a lightweight aluminum alloy or similar thermally conductive material, and is formed in a substantially "wraparound" configuration as shown. A power transistor 1126 is mated to the interior side of the sink 130 using, e.g., a screw and metallic heat conduit (integral with the transistor 1126) to permit maximal heat transfer from the transistor to the sink. The sink 130 further optionally includes a plurality of ventilation holes or apertures formed therein to facilitate airflow through the module 102. The sink 130 also includes to two distal plates 131 which are used to both dissipate heat and allow mounting of the apparatus 100 to an external device such as a conventional junction box.

The wraparound configuration of the exemplary heat sink 130 provides another benefit relating to thermal dissipation and power rating. Specifically, whereas prior art approaches (see FIG. 14 and supporting discussion) used a breakaway mechanism that effectively requires loss of portions of the sink as more control modules are juxtaposed, the wraparound sink 130 of the present invention allows for no de-rating of the electrical power or other properties of the module 102 as multiple modules are ganged or juxtaposed. Hence, whereas a single module under the prior art may be rated for 1000 W, and two juxtaposed rated for 750 W each (2×750=1000W total, de-rated from 1000W each due to "loss" of one side of the module for heat dissipation purposes), the present invention would allow each of the two modules to be rated at 1000 W, thereby providing a total capacity of 2000 W (2×1000 W).

The substrate 134 is disposed in a substantially vertical orientation, and contains a plurality of electronic components including the terminals of the power transistor 1106, capacitors, inductors, resistors, diodes, integrated circuits, etc. as described below with respect to FIGS. 11b and 12b. An air gap actuator 121 and assembly 123 are also provided at the top (upper) portion of the module and substrate 134 as described in greater detail below.

Figure 1D:
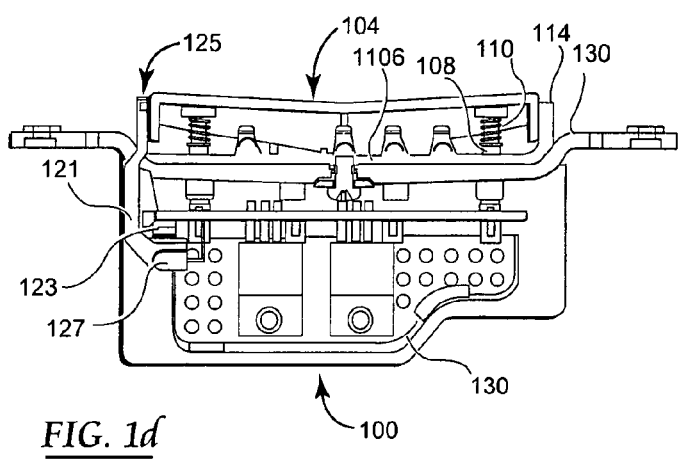

FIG. 1d is a side cross-sectional view of the module and element of FIG. 1a (assembled) taken along line 1c-1c, showing the various constituent components. As shown in this Figure, the control module 102 further includes an air gap actuator 121 and assembly 123 which are used to satisfy well known electrical code requirements of providing a mechanical air gap or interruption mechanism. The actuator 121 projects forward within the module 102 and provides the user with an exposed end 125 by which the user can move the actuator 121 forward, thereby opening the air gap and effectively disabling the module 102 electrically. The air gap actuator 121 also acts as a light pipe or optical conduit, transferring light from one multicolored (or two unitary colored) internal LEDs 127 to the front face of the module 102. The "green" LED color is used when the rocker or other control element causes the switch within the module 102 to be closed, while the "red" LED color corresponds to the open position for the switch (these assignments are completely arbitrary and hence may be altered). When the air gap is opened (actuator pulled forward), no light is generated by the LED(s) and hence none is coupled to the front face of the actuator 121.

Advantageously, the control apparatus of the present invention can also be used to implement a "room control system". Specifically, multiple functions can be integrated into one control apparatus 100 (or a group of closely spaced apparatus), thereby providing both lower cost and a unified co-located control solution. This is particularly advantageous where such unification is needed or desired, and/or space is limited, such as in a shipboard (e.g., cruise liner) stateroom application. Multiple "satellite" or remote devices in the same room can also be controlled using a single (e.g., 4 control) switch.

The apparatus 100 can also be made fully connectorized so as to both provide additional modularity as well as ease if installation and removal. Any number of connector configurations well known to those of ordinary skill in the art may be used consistent with the invention to facilitate this feature.

OTHER EMBODIMENTS

Figure 2:
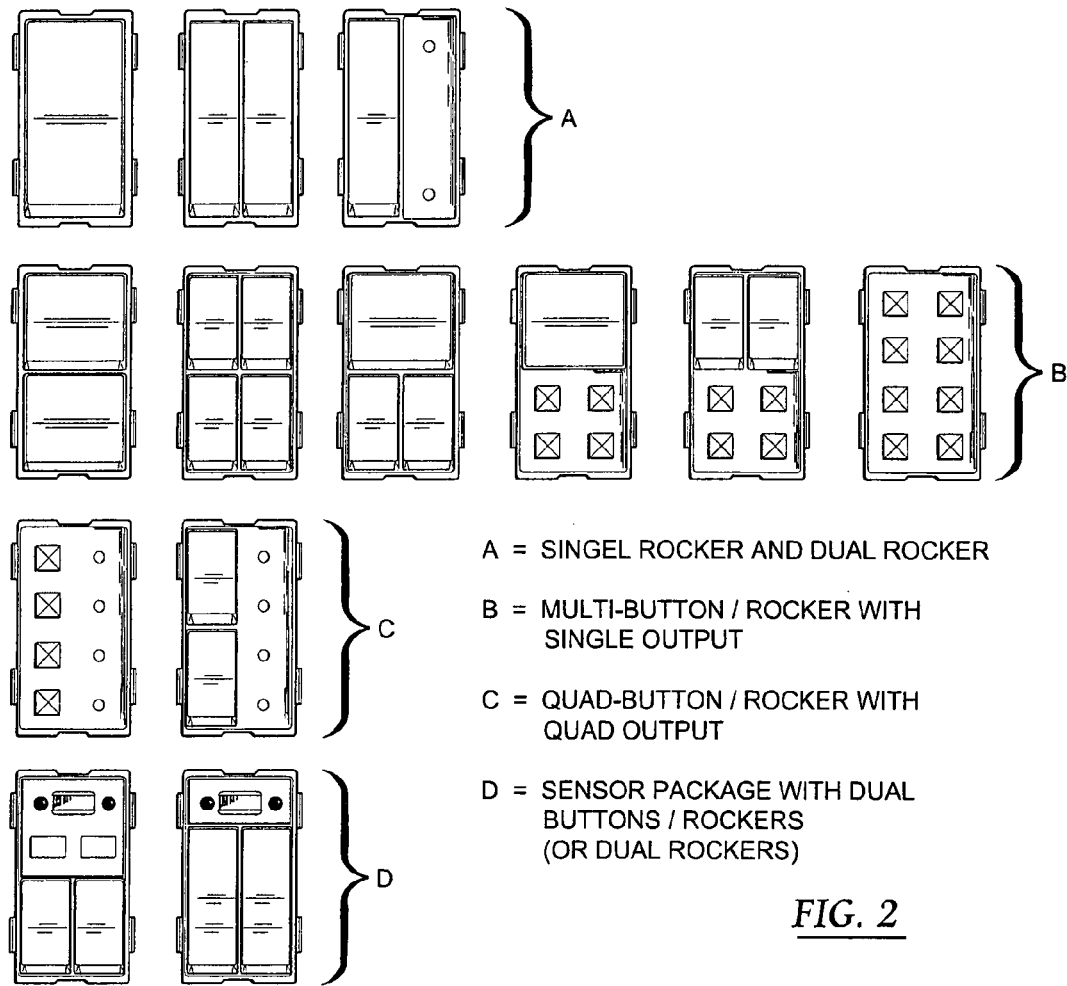
FIG. 2 is a composite front plan view of various different embodiments of the control apparatus of the invention, according to family.

FIG. 2 is a composite front plan view of various different embodiments of the control apparatus of the invention, according to family. The illustrated embodiments are merely examples of different configurations, and many others will be immediately recognized by those of ordinary skill. As used in the present context, the term "family" refers to the fact that a common configuration of the substrate 134 (e.g., PCB) is used for each of the different configurations in that same family, thereby advantageously increasing the leverage provided by the use of common and interchangeable components ("universality").

Figure 3A:
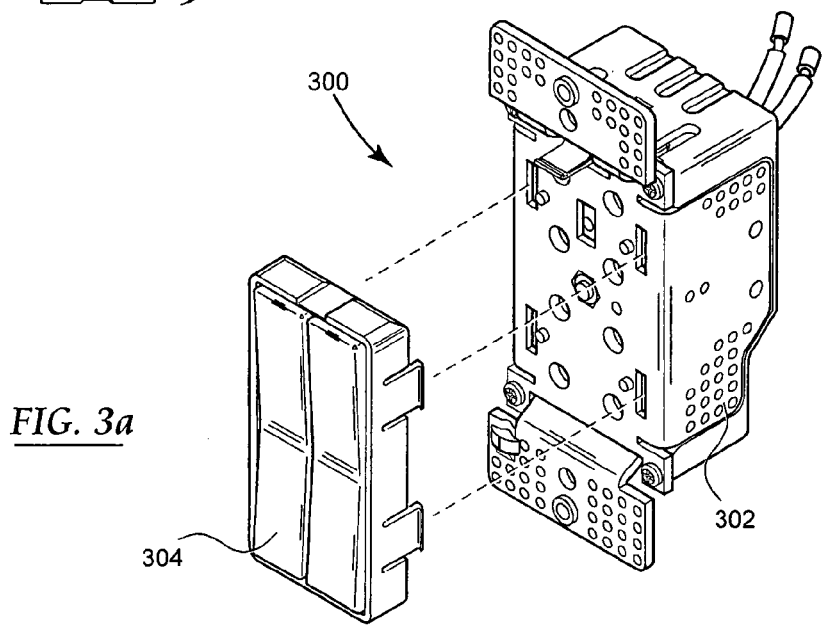
FIG. 3a is a front perspective view of a dual full height rocker embodiment of the control apparatus of the present invention, shown partly disassembled.
Figure 3B:
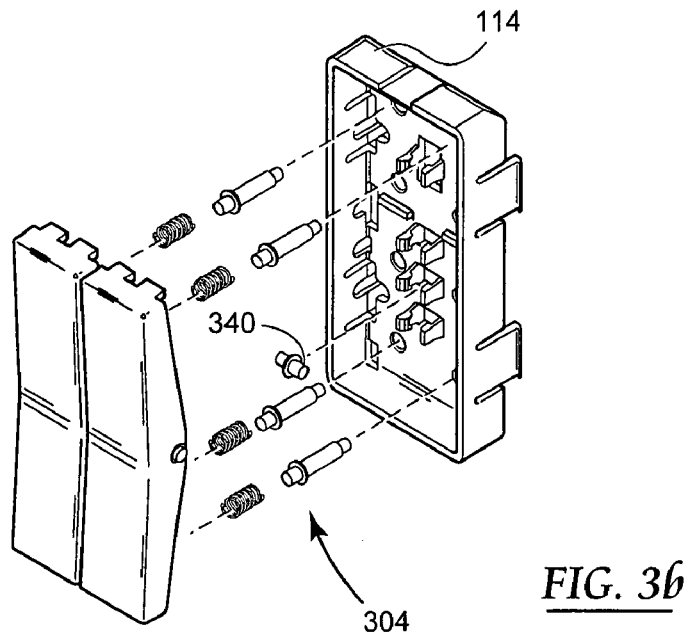

FIG. 3a is a front perspective view of yet another embodiment of the control apparatus 300 of the present invention, shown partly disassembled. Here, a dual-rocker element 304 is used. FIG. 3b is an exploded perspective view of the removable control element used with the control apparatus of FIG. 3a. A central retainer element 340 (FIG. 3b) is used to retain and maintain alignment of the two juxtaposed rockers.

Figure 3C:
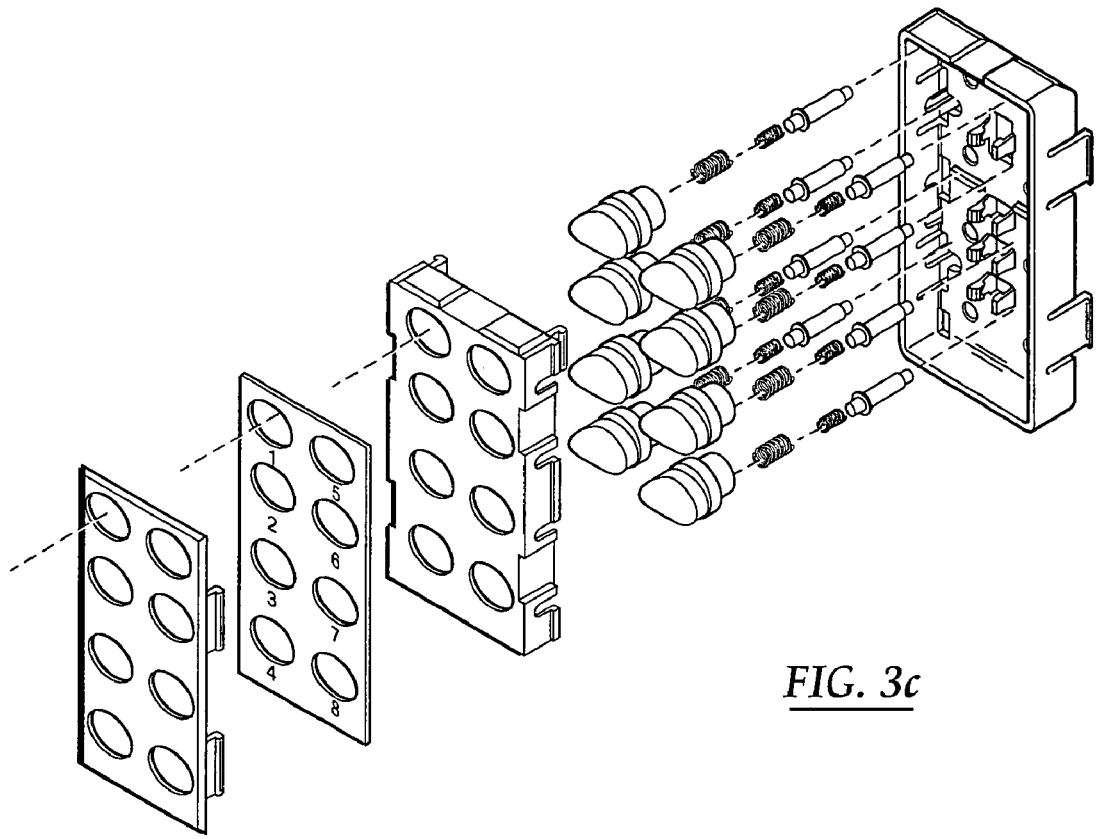
FIG. 3c is an exploded perspective view of a removable control element comprising an eight button configuration that can be utilized with the control module of FIG. 1c.

FIG. 3c is a front perspective view of yet another embodiment of the removable control element used with the control apparatus of FIG. 3a. Here, the control element dispatches with the rocker element, and instead utilizes a multi-pushbutton (e.g., 8-button) configuration.

Figure 4A:
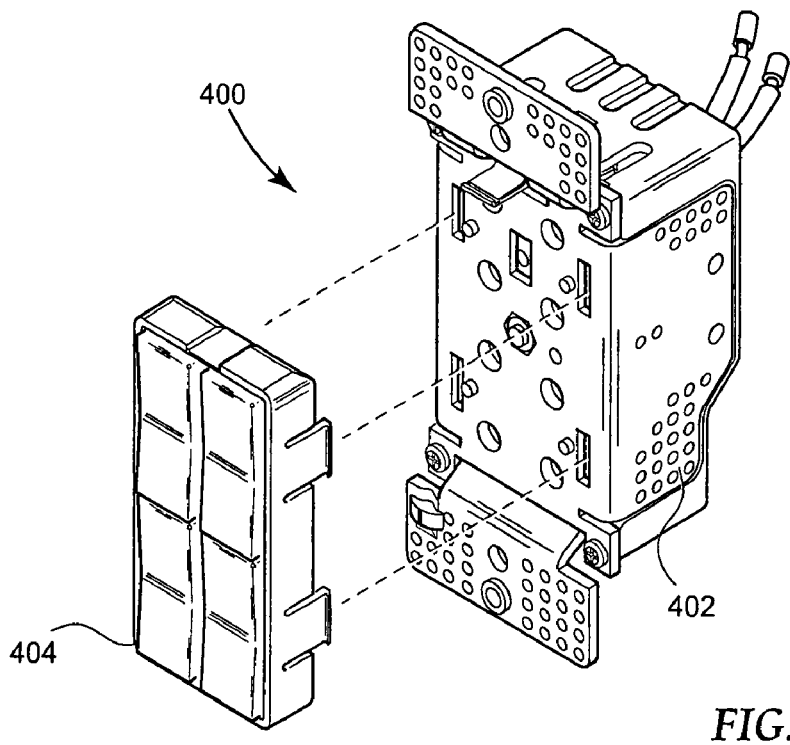
FIG. 4a is a front perspective view of a quad half-height embodiment of the control apparatus of the present invention, shown partly disassembled.
Figure 4B:
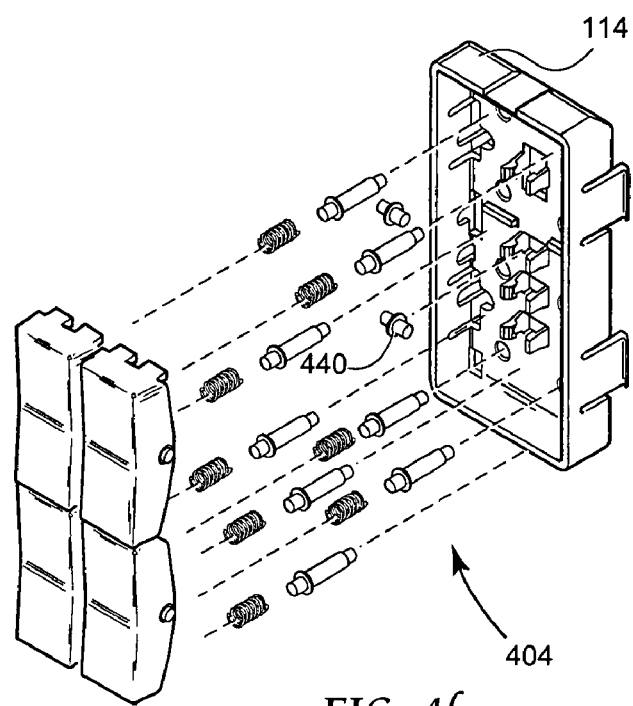

FIG. 4a is a front perspective view of another embodiment of the control apparatus of the present invention, shown partly disassembled. FIG. 4b is an exploded perspective view of the removable control element 404 used with the control apparatus of FIG. 4a. Here, the apparatus 400 comprises a quad-rocker control assembly 404 allowing control of at least four different functions.

Figure 5A:
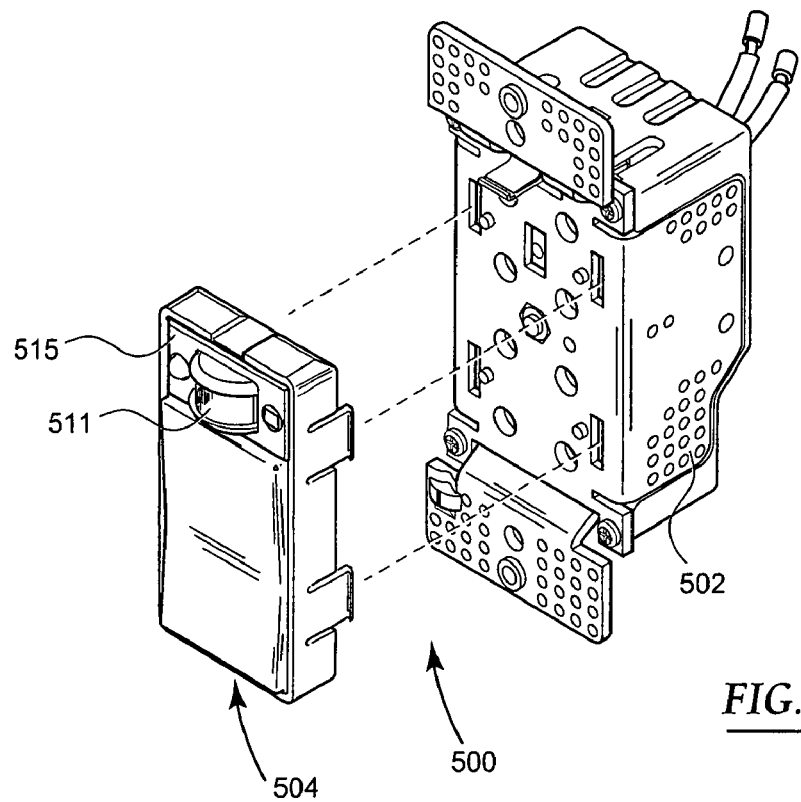
FIG. 5a is a front perspective view of yet another embodiment of the control apparatus of the present invention, shown partly disassembled.
Figure 5B:
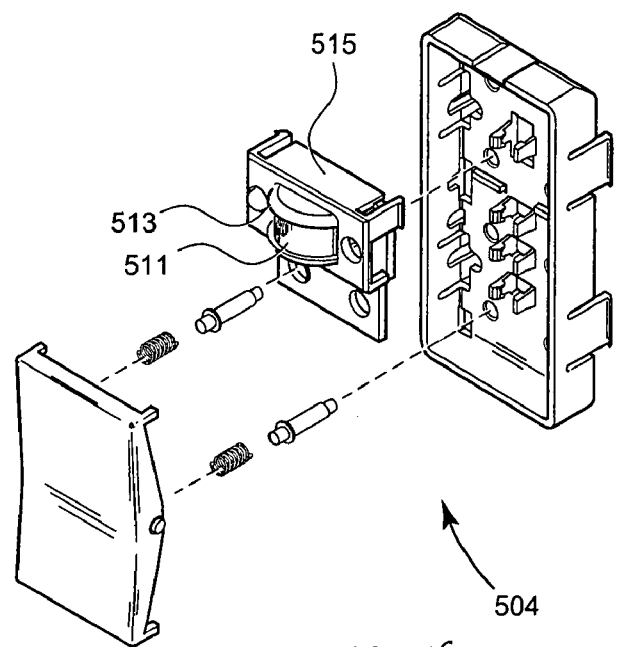

FIG. 5a is a front perspective view of another embodiment of the control apparatus 500 of the present invention, shown partly disassembled. FIG. 5b is an exploded perspective view of the removable control element 504 used with the control apparatus 500 of FIG. 5a. In this embodiment, a single double-wide rocker element is used in conjunction with a sensor 511 (e.g., light and PIR or IR sensor), as well as an IR temperature sensor and IR remote sensor 513. The sensors 513 may be disposed within the sensor sub-portion 515 of the element 504, or alternatively (and more preferably) are disposed within the control module 502, with the light temperature and control energy being transmitted to a remote system controller.

It is also noted that in order to maintain a uniform vertical (height) profile, the rocker switch has been vertically scaled; hence, a larger aperture or faceplate is not required.

Figure 6A:
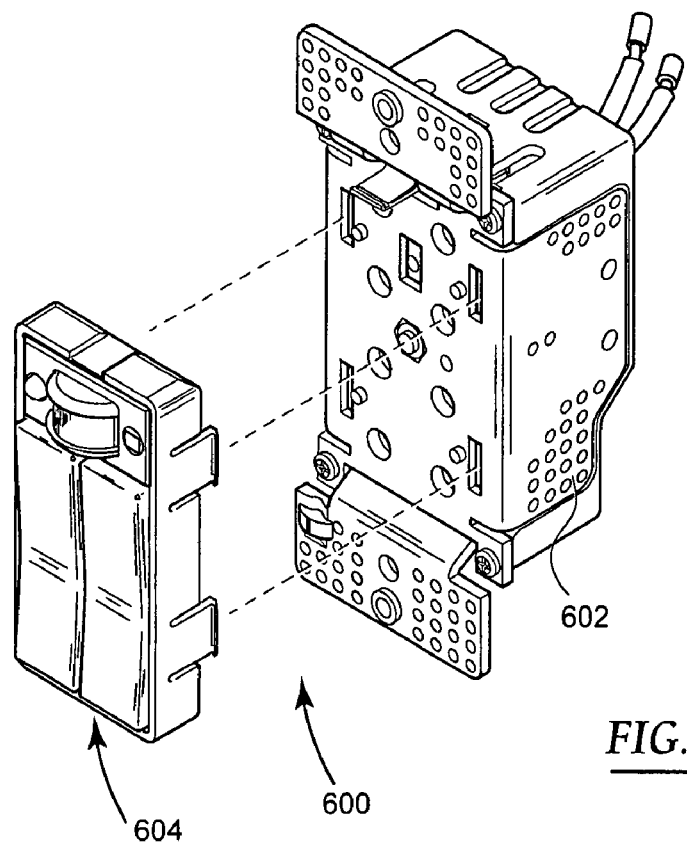
FIG. 6a is a front perspective view of still another embodiment of the control apparatus of the present invention, shown partly disassembled.
Figure 6B:
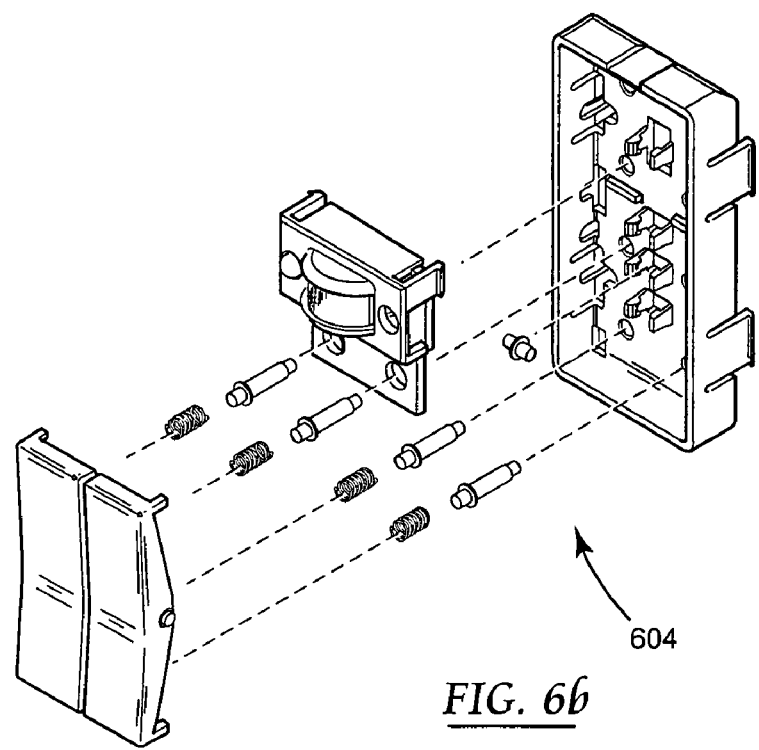

FIG. 6a is a front perspective view of another embodiment of the control apparatus 600 of the present invention, shown partly disassembled. FIG. 6b is an exploded perspective view of the removable control element 604 used with the control apparatus 600 of FIG. 6a. In this embodiment, the control element 604 comprises one similar to that of FIG. 5*a* discussed above, yet comprises a double-rocker switch.

Figure 7A:
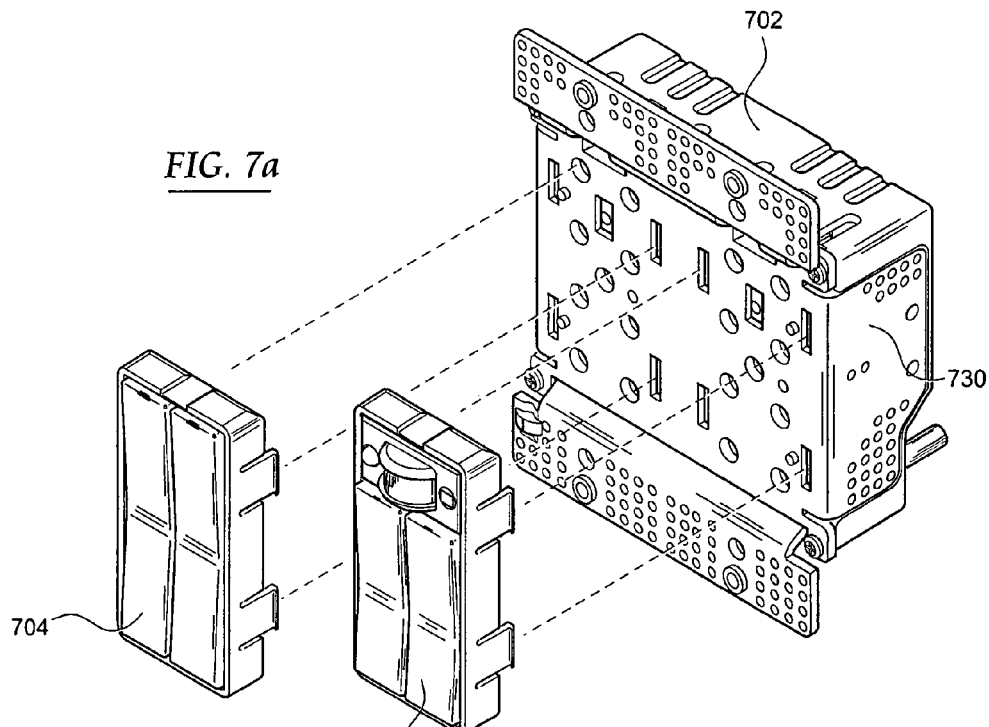
FIG. 7a is a front perspective view of another embodiment of the control apparatus of the present invention, shown partly disassembled.
Figure 7B:
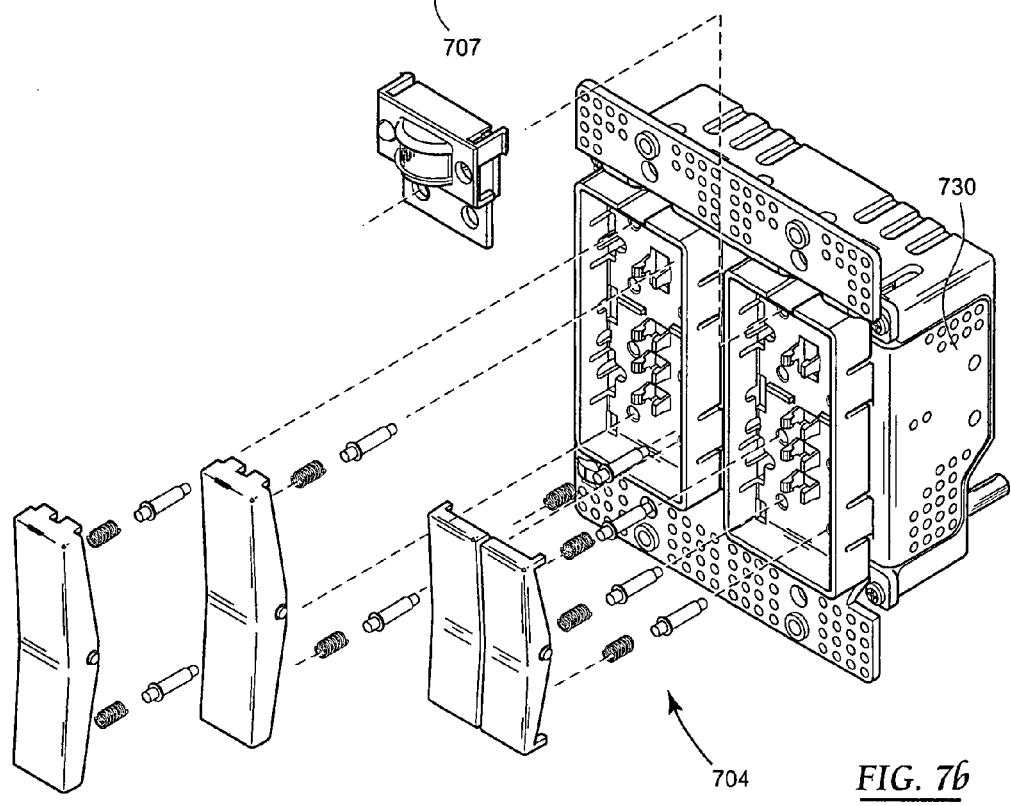

FIG. 7*a* is a front perspective view of another embodiment of the control apparatus of the present invention, shown partly disassembled. FIG. 7*b* is an exploded perspective view of the removable control element 704 used with the control apparatus 700 of FIG. 7*a*. In this embodiment, a double wide (or even triple or quadruple wide) module 702 is used to facilitate the control of multiple functions at a given common location, including for example the illustrated rocker switch element 704 and the combined rocker switch/sensor device 707. The module may comprise (i) a unified module having a larger (e.g., double-wide) substrate, housing, etc., or (ii) two single-wide modules juxtaposed next to one another. The heat sink 730 of this embodiment is also advantageously double-wide as well, thereby providing for no reduction in thermal power dissipation due to aggregation of two or more control elements. As with the single-width sinks 130 previously described with respect to FIG. 1, the double-wide sink 730 provides additional heat rejection capacity for the module 702, thereby avoiding any power de-rating of the module.

Figure 8A:
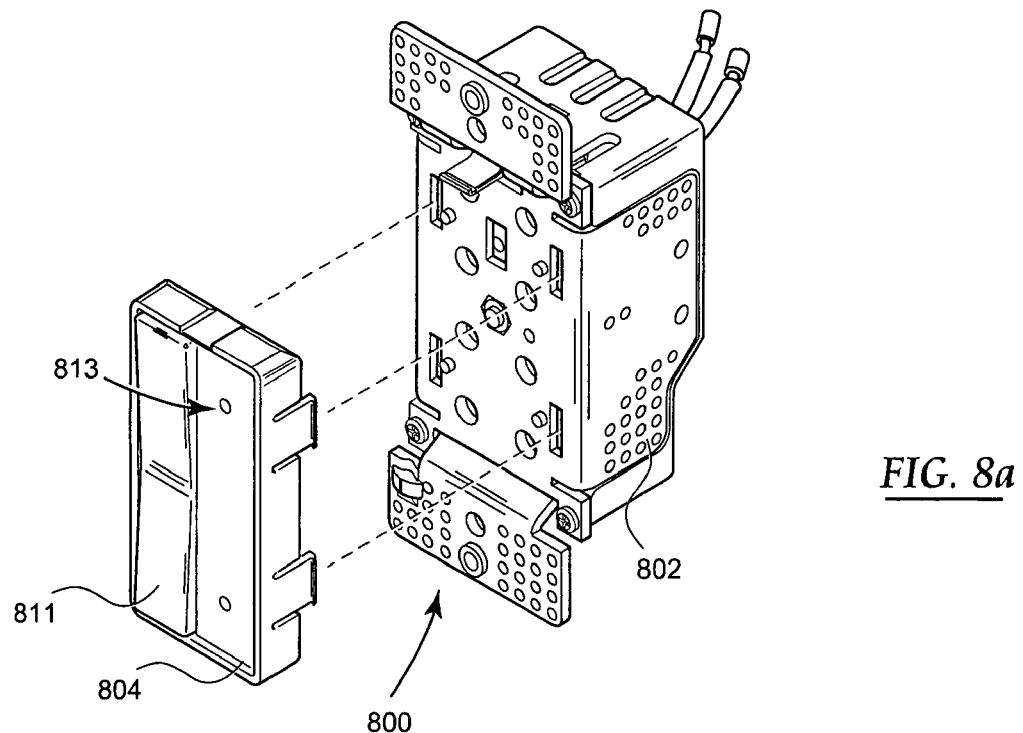
FIG. 8a is a front perspective view of another embodiment of the control apparatus of the present invention, shown partly disassembled.
Figure 8B:
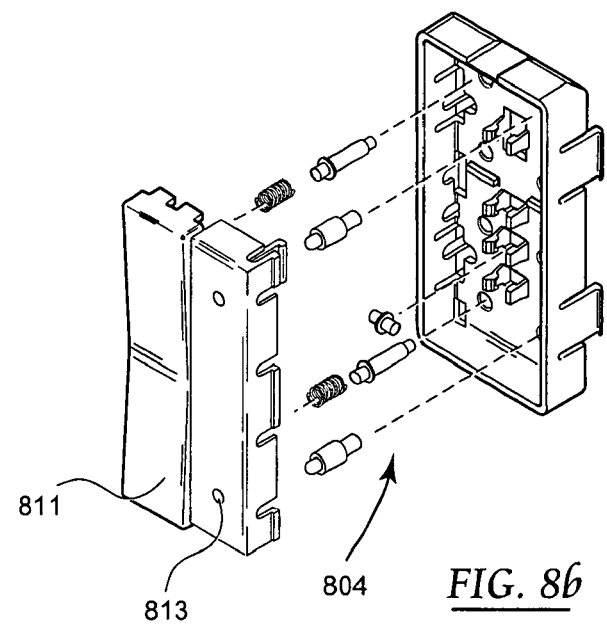

FIG. 8*a* is a front perspective view of another embodiment of the control apparatus 800 of the present invention, shown partly disassembled. FIG. 8*b* is an exploded perspective view of the removable control element 804 used with the control apparatus 800 of FIG. 8*a*. In this embodiment, a single (narrow) rocker switch 811 is provided in conjunction with one or more indicators 813 (e.g., light-pipes serviced by LEDs within the module 802). The indicators allow the user to observe the status of the control function, as well as other optional programmatic functions that can be communicated through the indicators; e.g., one or more rates of blinking indicative of certain conditions, or a prescribed blink or coloration sequence (e.g., red followed by green) to indicate another event or state of the controlled apparatus. It will be appreciated that these optional programmatic functions and features may also be utilized in conjunction with the air gap light pipe/actuator 121 as well.

Figure 9A:
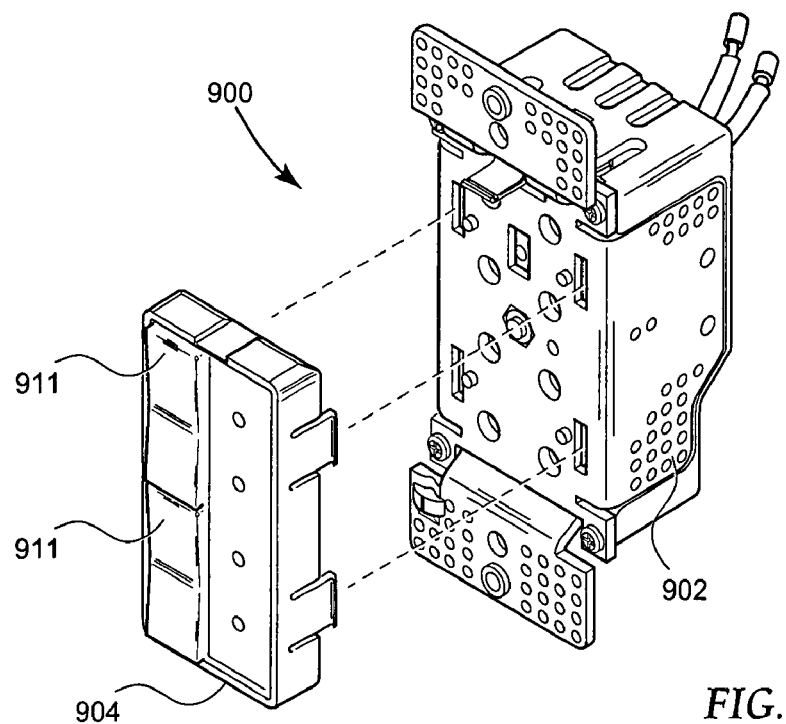
FIG. 9a is a front perspective view of another embodiment of the control apparatus of the present invention, shown partly disassembled.
Figure 9B:
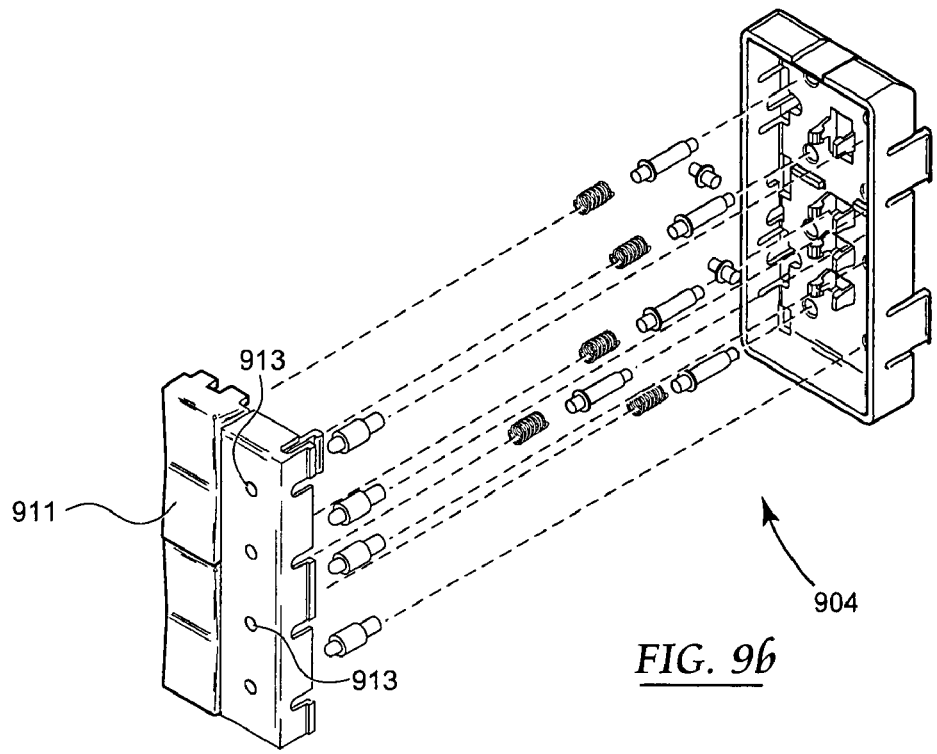

FIG. 9*a* is a front perspective view of still another embodiment of the control apparatus 900 of the present invention, shown partly disassembled. FIG. 9*b* is an exploded perspective view of the removable control element 904 used with the control apparatus 900 of FIG. 9*a*. Here, a set of dual rockers 911 is used (each being half-height) as well as four indicators 913 visible to the user.

Figure 10A:
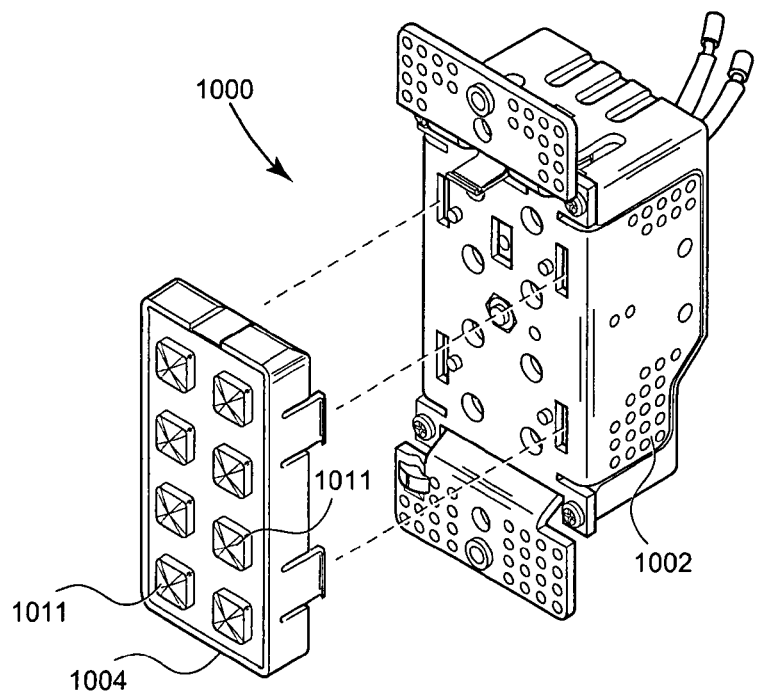
FIG. 10a is a front perspective view of another embodiment of the control apparatus of the present invention, shown partly disassembled.
Figure 10B:
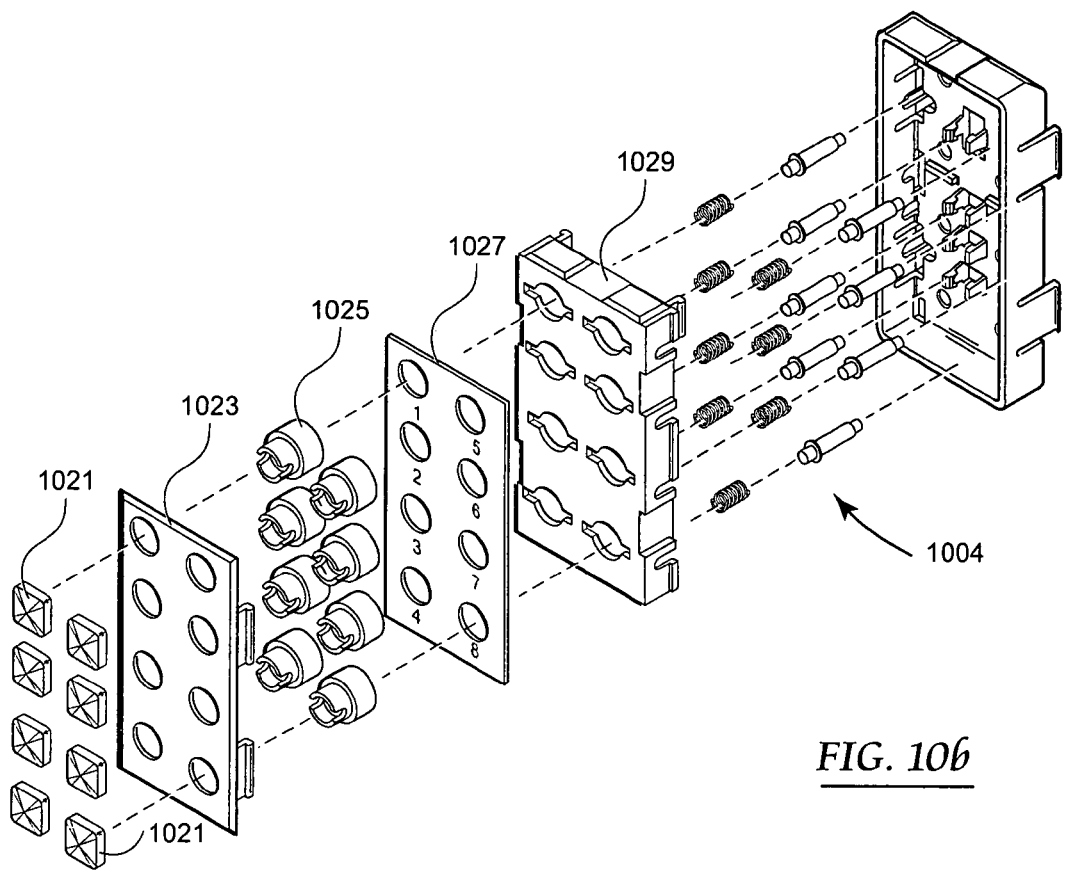

FIG. 10*a* is a front perspective view of another embodiment of the control apparatus 1000 of the present invention, shown partly disassembled. FIG. 10*b* is an exploded perspective view of the removable control element 1004 used with the control apparatus 1000 of FIG. 10*a*. In this embodiment, a plurality (e.g., eight) different actuators or buttons 1011 are provided, so as to control at least eight different functions within the module 1002. For example, each button may comprise a different lighting program, "scene" or theme that may be selected by the user.

Furthermore, as best shown in FIG. 10*b*, the control element 1004 is comprises of a user/installer-variable configuration having removable and replaceable outer buttons 1021, a transparent or translucent face plate 1023, button retainers 1025, a removable and replaceable label sheet 1027, and an internal support housing element 1029. As will be recognized, the outer buttons 1021 may be easily removed and replaced by the user or installer (such as for aesthetic purposes), and also the label sheet 1027 replaced in order to change the labeling of the functions (or provide no labeling at all, such as where only a given pattern and/or color is desired, or to change the background color of the labeling). Hence, the user or installer need not select a device based on the aesthetics of the buttons (or the control element as a whole, for that matter), but rather can produce a custom configuration adapted to their particular needs at very low cost and with great ease.

It will be appreciated that the foregoing concept of button replacement can also be extended to other types of actuators and even sensors, such as where the user desires a different facial appearance of a sensor, illuminator, etc.

Furthermore, the light pipes or other optical conduits used in any of the embodiments herein can be easily and simply changed out for one of a different character, e.g., to change the color displayed. For example, in one variant, a white light LED of the type well known in the art is used on the internal substrate 134; the lens or light pipe is then changed out as desired in order to provide the desired color of illumination. Alternatively, the light pipe can be used to produce other colors, such as where a red LED color is passed through a yellow light pipe top produce an orange appearance to the user.

Electrical Functions

FIG. 11*a* is a schematic of one embodiment of the control circuitry of the control module 102 (exemplary convertible rocker wall switch/dimmer) according to the invention. The circuit 1100 generally comprises, inter alia, a controller 1101, a switch matrix 1102, satellite control leads 1104 and associated filters, current sensor 1105 (which may be a discrete, integrated circuit, or mixed device), a plurality of output triacs 1106, and a power supply 1107, as well as numerous other discrete electronic components (resistors, capacitors, inductors, etc.) as shown. As is well known, a triac comprises a type of semiconductor device wherein 5 layers form 3 PN junctions in each of two directions. Triacs are functionally equivalent to two thyristors in anti-parallel. While the use of a triac is exemplary, it is recognized by one of ordinary skill that an alternative circuit element or elements could be used to accomplish the same functional equivalence (e.g., silicon controlled rectifiers (i.e., SCRs)). UPB transmit and receive functions 1110, 1112 are also provided by the controller 1101 as described in greater detail below with respect to the embodiment of FIG. 17

Figure 17:
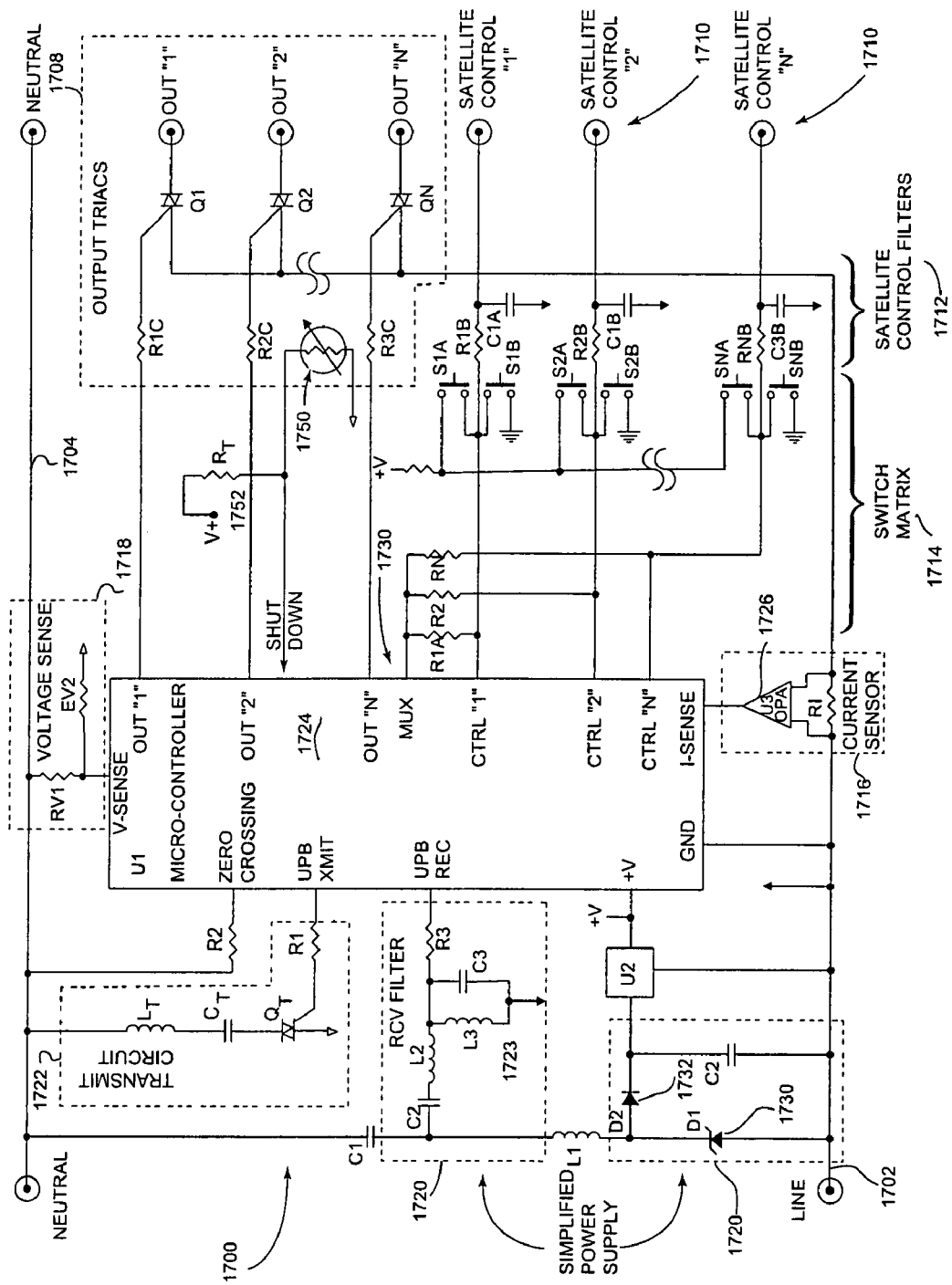
FIG. 17 is a schematic of one embodiment of an improved controller circuit (referenced to the line conductor) according to the invention.

In yet another embodiment, the control circuitry of the control module 102 described above may further comprise a temperature switched thermistor electrically attached to one or more of the triac heat sinks. The purpose of these thermistors is to shut down or disable the triac driver should the triac's maximum acceptable temperature be reached, thereby protecting against overheating damage to the (e.g. dimmer) switch. Implementation of this embodiment is also a very low cost solution to prevent the accidental overheating by a customer of a light circuit through, e.g., use of a wattage above the maximum wattage design capabilities or recommendations. See the discussion of FIG. 17 presented subsequently herein.

Figure 11B:
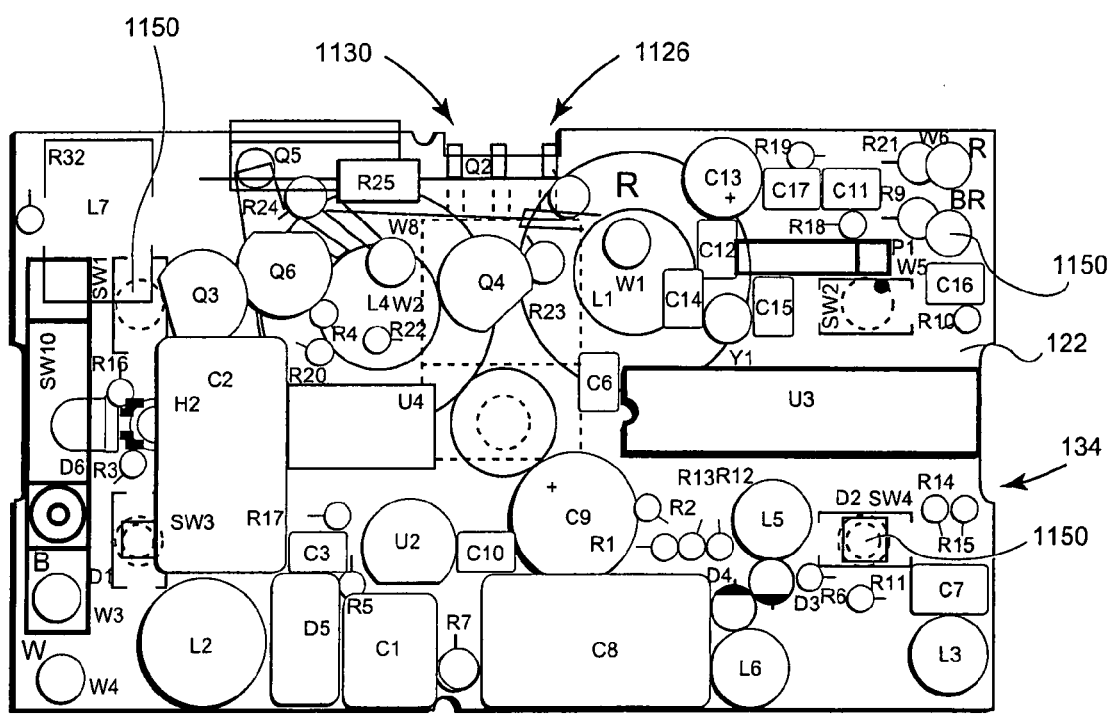

FIG. 11*b* is a top plan view of one embodiment of the internal substrate 134 (PCB) of the control module of FIG. 11*a*. As shown, the substrate 134 comprises a standard one or multi-layer PCB 1122 on which the circuit components of the circuit of FIG. 11*a* are mounted. In the illustrated embodiment, the power transistor(s) 1126 and any other heat-producing components are disposed in the most thermally efficient location on the control module substrate 1122 in order to maximize heat dissipation. The other components are purposely populated on the same side of the substrate as the terminals of the power transistor 1126, thereby placing all components on one side of the PCB 1122. This approach advantageously allows for wave soldering of all joints on the substrate, thereby reducing manufacturing costs and simplifying the assembly process. The sole exception to this rule is the body of the power transistor 1126, which is folded around the back (solder) side of the PCB 1122 (the leads of the transistor being received in a groove formed in the side edge of the PCB 1122) between the PCB and the wraparound heat sink 130, thereby placing it in a central portion of the heat sink to maximize the efficiency of the latter at dissipating the substantial heat of the transistor 1126. The transistor 1126 is fastened to the heat sink via a screw to maintain contact (and hence a thermal conduction path).

It will also be appreciated that the substrate 1122 contains one or more apertures 1150 formed through its thickness (see FIG. 11*b*). These apertures advantageously allow the plungers or other mechanisms of the control element 104 to actuate microswitches or other similar devices disposed on the PCB 1122, thereby (i) facilitating the aforementioned wave solder process, and (ii) allowing all such switches to be removed from the control element 104 in favor of being disposed internal to the control module 102 (i.e., on PCB). This also arguably provides an electrical safety benefit, since the microswitches or other such components are disposed within the control module and further away from components that the user normally comes in contact with.

In another aspect of the invention, an improved method of manufacturing an electronic assembly is disclosed. In one embodiment the method comprises using a bendable or deformable power transistor device 1126 on the substrate 134 to allow testing of the circuit board 1122 or other assembly or components before the board 1122 is populated. Specifically, in one embodiment of the method, the transistor 1126 is terminated to the appropriate leads on the PCB 1122, and maintained in an upright (largely normal) orientation with respect to the PCB. The PCB is then tested, and if passed, the power transistor 1126 is then subsequently bent down into place (i.e., on the opposing side of the PCB 1122) for further assembly. This approach greatly reduces costs associated with assembling and populating the substrate 134 and then testing (as in the prior art). Testing the PCB at an earlier stage allows for failed components to be removed earlier, thereby obviating labor and components wasted on such devices.

Figure 12B:
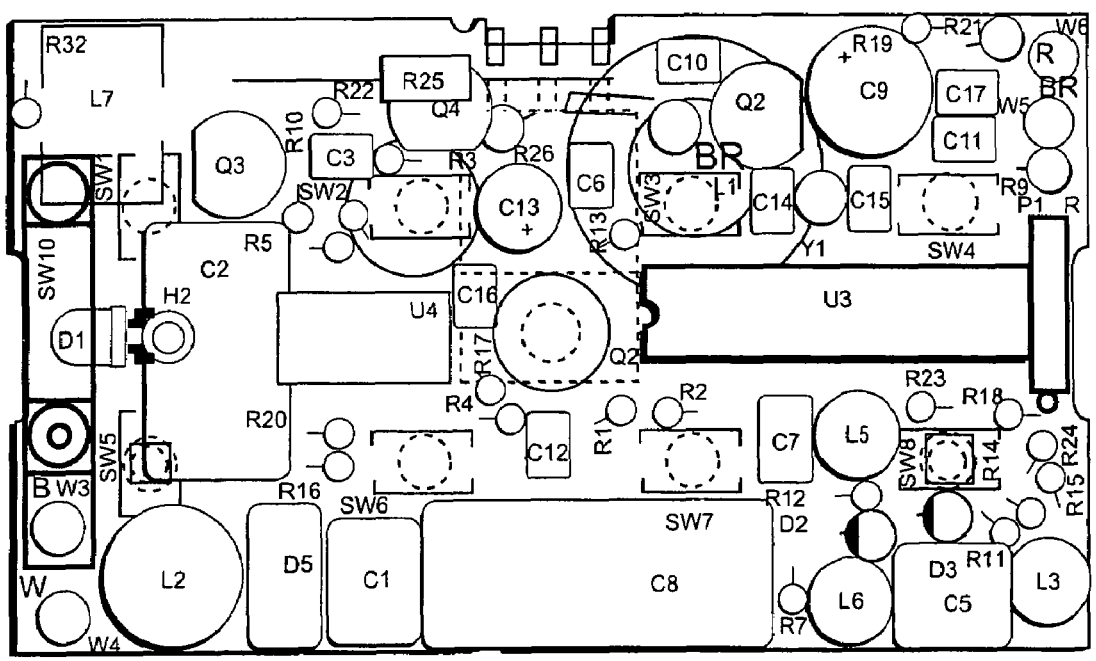

FIG. 12*a* is a schematic of another embodiment of the control circuit 1200 of the control module (exemplary eight-button rocker wall switch/dimmer) according to the invention. FIG. 12*b* is a top plan view of one embodiment of the internal substrate of the control module of FIG. 12*a*.

FIG. 13 is an exploded perspective view of another exemplary heat sink configuration according to the invention, showing both control module wrap-around and top/bottom heat sink elements relative to a conventional junction box. In this embodiment, the wraparound heat sink 130 of the embodiment of FIGS. 1*a*-1*d* (and others) is supplemented by use of one or more additional sink elements 1302, 1304 which mate with the apparatus module 102 as well as the junction box 1310 into which the apparatus 100 is mounted. These elements 1302, 1304 are intended to further dissipate thermal energy by way of the junction box 1310, primarily through conduction therewith. These elements are optional, and hence may be used as required in order to maintain the desired heat rejection (and hence power rating) for the installed device. Similar to the wraparound heat sink 130, these elements 1302, 1304 are fashioned from a thermally conductive metal (e.g., aluminum or aluminum alloy) for low cost, ease of handling, and light weight. However, other thermally conductive materials may conceivably be used. Furthermore, the various heat sink components illustrated may be combined into one or more aggregated components if desired.

FIG. 14 is a composite view illustrating a prior art break-away heat sink configuration and associated power ratings. As is reflected in the data of FIG. 14, significant power de-rating occurs as portions (e.g., side sections) of the prior heat sink are broken away to accommodate more switch or control units in parallel. This is an undesirable consequence of the heat sink architecture used in these devices.

In contrast, the illustrated embodiments of the heat sink (either wraparound sink 130 alone, or wraparound and supplemental elements 1302, 1304), additional thermal rejection capability is provided, especially in ganged or multi-device installations, thereby substantially increasing the power ratings of these devices.

Screw-less Heat Sink

Figure 15:
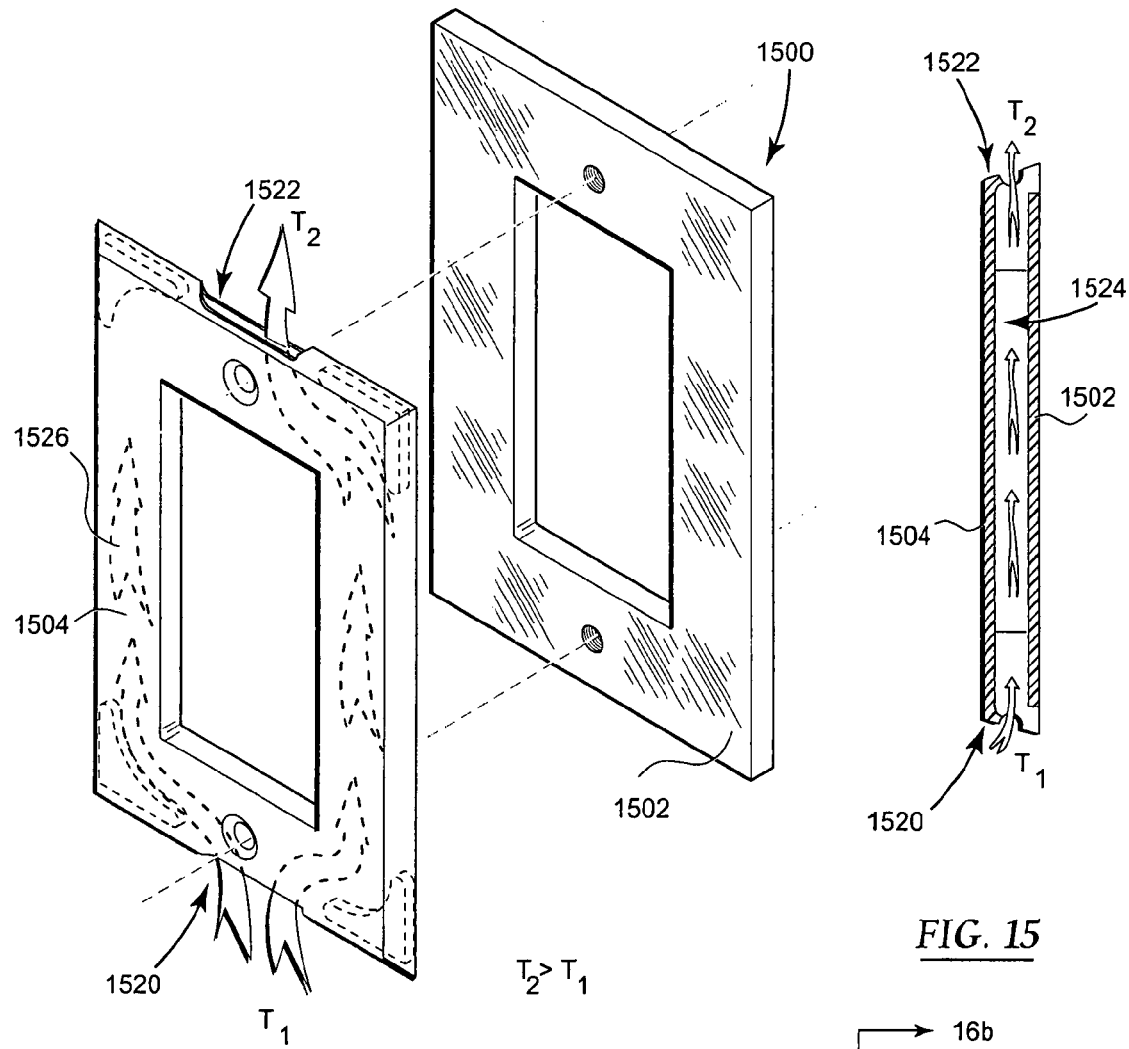
FIG. 15 is an exploded perspective view of an exemplary "screw-less" heat sink configuration according to the invention.

FIG. 15 is an exploded perspective view of an exemplary "screw-less" heat sink configuration according to the invention. As is well known, screw-less faceplates are used for, e.g., lighting controls to hide the screws normally associated with a faceplate. The face plate contains two features on its back (non-visible) side that cooperate with the junction box screws used to conventionally attach the face plate, thereby providing the user with improved aesthetic appearance.

However, such prior art screw-less configurations have no facility for thermal energy dissipation via the face plate or its underlying structures. Simply stated, the prior art does not teach heat rejection through the face plate region.

In the illustrated embodiment of FIG. 15, such heat rejection is utilized. Specifically, the apparatus 1500 comprises a heat sink plate 1502 and corresponding front face plate 1504, the latter being offset at least some from the heat sink 1502. Heat may be coupled into the sink plate 1502 via direct conduction (e.g., from the wrap-around sink 130 previously described), convection, and/or radiation (e.g., IR) as is well known in the art. Similarly, the sink plate 1502 then rejects the heat to the local ambient environment. However, unless some mechanism for rejecting this heat from the local ambient to the broader ambient is provided, the efficacy of the sink plate 1502 would be greatly reduced.

Accordingly, the illustrated embodiment uses a plurality (e.g., two) airflow apertures 1520, 1522 and airflow channels 1526, 1528 formed within the annulus 1524 between the outer face of the heat sink plate 1502 and the rear face of the face plate 1504 (i.e., up and around the sides of the rocker switch or other centrally disposed control element). In this fashion, heated air within the channels begins to rise due to the density differential with the colder surrounding air, and a natural thermal circulation driving force (thermal driving head, also sometimes referred to as "chimney effect") is established, which continues unabated while the heat sink continues to reject heat. This continued flow provides the desired heat dissipation from local ambient to the broader ambient environment around the control module.

As will be appreciated, more or differently disposed apertures and/or airflow channels may be used consistent with the particular application, thermal loading (rating), etc.

The exemplary heat sink 1502 is formed from a metal (e.g., aluminum for light weight and good thermal characteristics, as well as low cost), although other materials may be used. The thermal coupling of the sink plate 1502 and the underlying switch, and the heat rejection rate, can be controlled through any number of factors including, e.g., proximity of the plate 1502 to the module "wrap-around" or other heat sink, thickness of the sink plate 1502, etc.

The faceplate 1504 is injection molded from ABS meeting UL94V-0 safety requirements, however other material may be used here as well.

In another embodiment, the face plate 1504 or heat sink plate 1502 (or other component) can be adapted to emit one or more aromas (e.g., floral or similar scents) or chemical substances by virtue of (i) the presence of thermal energy within the heat sink plate 1502, and (ii) a quantity of a chemical adapted to emit aroma under the application of heat. As in well known "plug-in" air fresheners, elevated temperature can be used as a catalyst for causing emission of aroma or other vapors into the ambient environment during the time the room is occupied.

In the illustrated embodiment, the natural circulation or convection described above for heat removal may also be used to transport the emitted chemical molecules out of the device and into the air volume surrounding the face plate 1504. Although the airflow is small, it is sufficient to transport aroma molecules into the local airspace in sufficient quantities. The thermal energy of the heat sink plate 1502 may be coupled into the aroma element via direct conduction, convection, and/or radiation (e.g., IR) as is well known in the art.

Advantageously, very minimal aroma is emitted when the heat sink temperature is at or near ambient, thereby coordinating the emission with (at least ostensibly) the presence of someone in the room where the module is located, or otherwise in the house. The face plate may, for example, contain a small removable and non-flammable chemical insert or "scent card" (not shown) that is disposed proximate to the heat sink plate 1502, such that the heat from the latter activates the card to emit its scent. Alternatively, the reverse side of the face plate may simply be coated with a scent-carrying thermally activated and non-flammable substance.

In this fashion, users cannot only change the appearance of the faceplate, but also the scent generated thereby during operation. Alternatively, if the user desires no scent, they can merely replace the face plate with a non-aromatic variety, or remove the aforementioned scent card, thereby disabling this functionality.

Display/Touch Control Module

Referring now to FIGS. 16a-16f, yet another embodiment of the control apparatus of the invention is described. In this embodiment, the apparatus 1600 comprises a control module 1602 having an electronic display and/or touch control element 1604. The illustrated apparatus utilizes an LCD display and control device of the type well known in the art, although it will be appreciated that other types of devices (such as TFT or FED) may be used depending on the application and functionality required.

In one variant, the element 1604 is adapted to both display various content (e.g., anything ranging from a single color through complex images) as well as displaying "soft" key functions. The soft key are coordinated with a touch (e.g., capacitive or resistive) screen matrix such that the user can input signals to the element 1604 via the touch screen, these functions being delineated visually by the image displayed on the underlying LCD display.

For example, in a "programming" mode of the device 1600, the LCD controller causes the display element 1604 to generate a predetermined (or variable) mask having a plurality of buttons and/or icons, much like a typical handheld PDA. The user or installer then simply actuates the required functions via finger contact (or a stylus), thereby inputting commands and/or data to the module controller. Such inputs may comprise literally any different type of functionality or aspect of operation of the apparatus 1600, such as without limitation:

(i) alteration of the default color and/or pattern displayed on the screen when not in the interactive or programming mode (including for example the display of certain graphical images, such as a artistic or colorful graphic or other aesthetic design element); (ii) programming or settings for one or more controlled devices (such as duration of "sleep" timer functions, thermostatic or other settings for actuation, invocation of particular programming for the controlled devices (e.g., lighting "scenes" or the like); (iii) actuation of one or more control functions (e.g., "turn on lights"), (iv) calibration, maintenance, and testing functions, etc.

The microcontroller of the control module may also be programmed to run one or more routines or even small software applications that control various operational aspects of the LCD/touch display element. For example, a simple application may create a moving or time-variant image on the LCD screen when not in use (akin to a PC screen saver). Alternatively, a calculator or electronic reminder pad application may be run, thereby allowing the user to perform calculations or store and recall data. Alternatively, a handwriting recognition algorithm of the type used in portable electronic tablets now ubiquitous may be run on the display/touch screen controller, such that the user can utilize a stylus or the like to handwrite notes as opposed to having to key them in. In this fashion, the apparatus acts as a convenient notepad for the occupants of the premises.

It will be recognized by those of ordinary skill that the hardware and software necessary to support such applications can be resident within the control apparatus 1600 and/or disposed locally or remotely thereto (such as in a separate module) as desired. For example, in one configuration, a highly power efficient and small gate-count embedded RISC processor (such as the A600 or A700 devices manufactured by ARC International of San Jose, Calif.) may be used to support the algorithms and applications running on the control apparatus 1600. Myriad other hardware and software configurations may be used dependent on the requirements of the application, desired power consumption, etc.

The illustrated embodiment of the apparatus 1600 further includes a plurality of apertures 1650 disposed on the front of the display element 1604 which allow the user or installer to selectively plug in different types of sensors as may be desired, such as a PIR sensor, room temperature sensor, light detector or level sensor, microwave device, and so forth.

The illustrated apparatus 1600 also comprises a plurality of triple-color LEDs or indicators which are used for backlighting of the apparatus (such as through one or more translucent or transparent portions of the bezel, faceplate, or the display element itself).

Figure 16A:
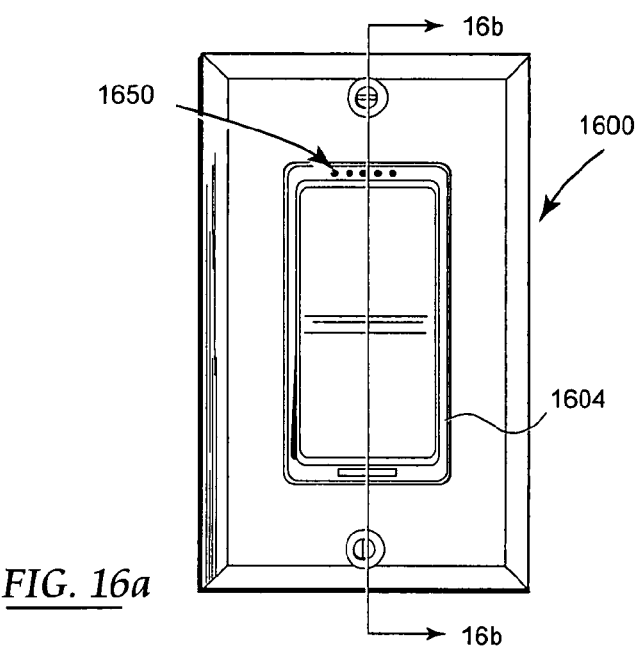
FIG. 16a is a front elevational view of another embodiment of the control apparatus of the invention, comprising an electronic display/control element.
Figure 16B:
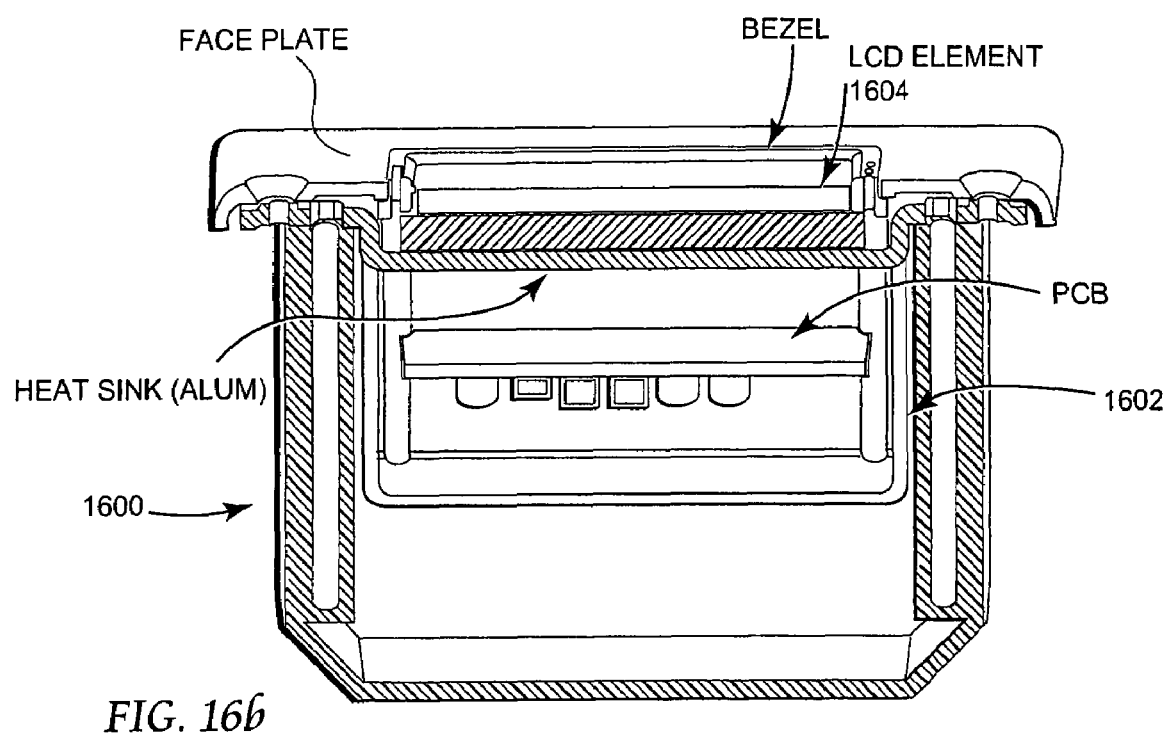
FIG. 16b is a side cross-sectional view of the module and element of FIG. 16a taken along line 16b-16b, showing the various constituent components.
Figure 16C:
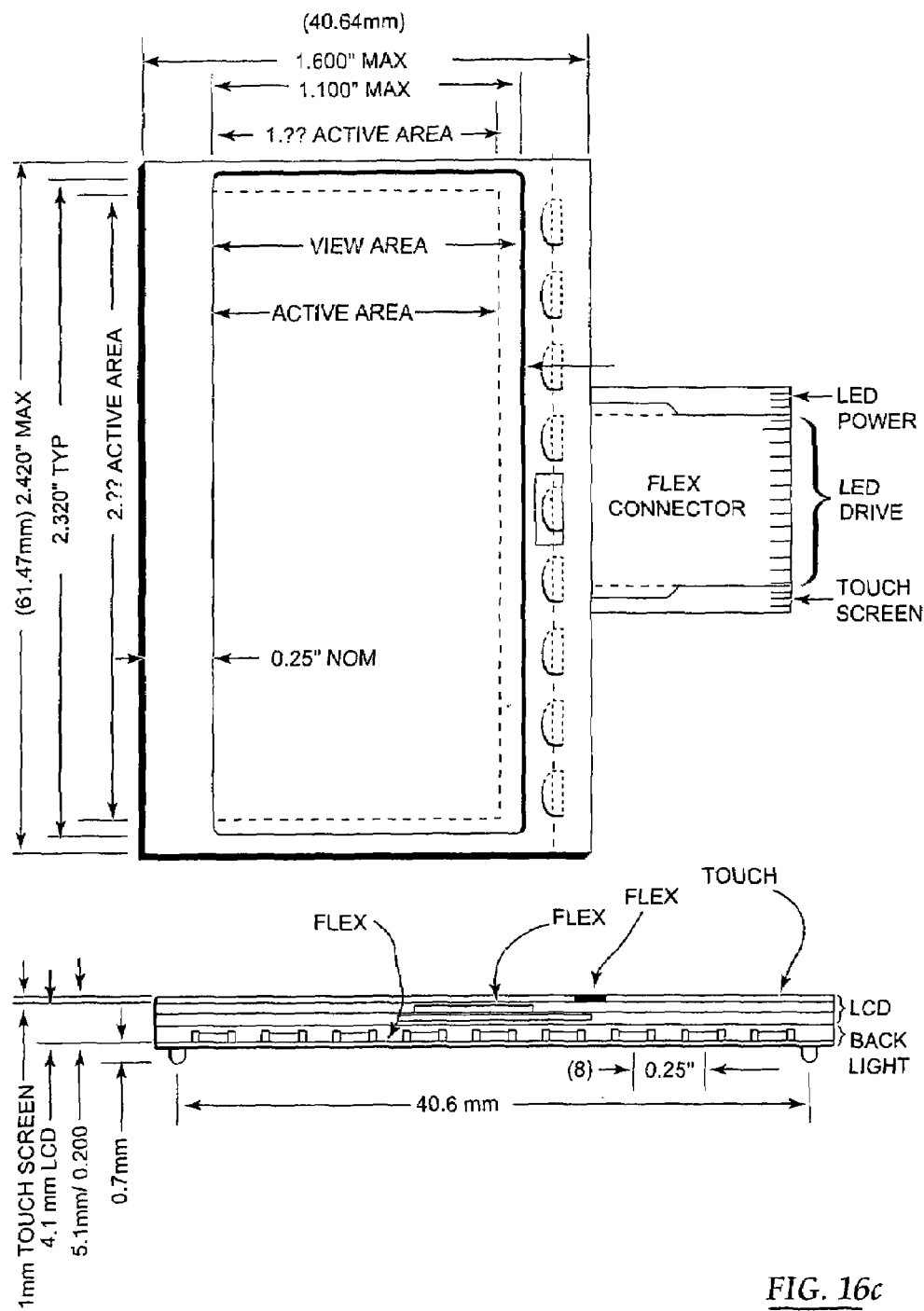
Figure 16D:
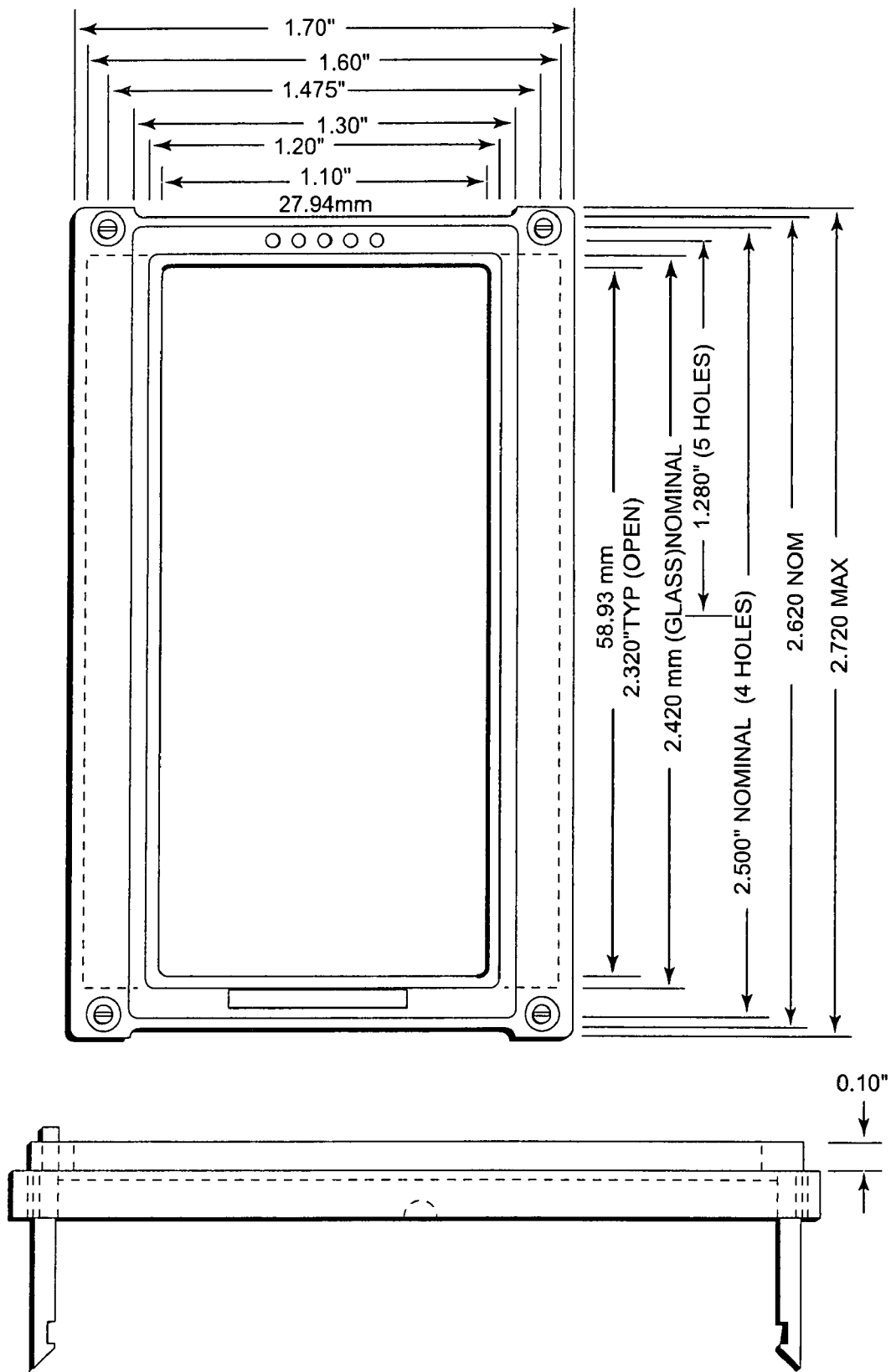
Figure 16F:
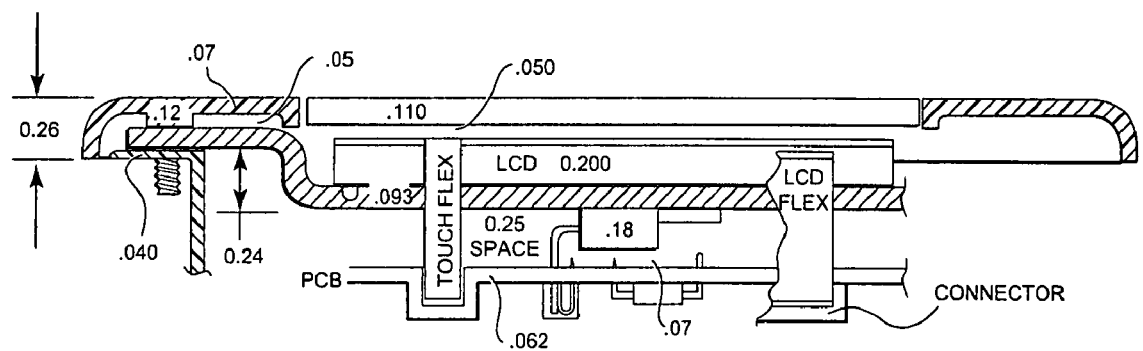

FIG. 16b is a side cross-sectional view of the module and element of FIG. 16a taken along line 16b-16b, showing the various constituent components.

FIGS. 16c-16f are dimensional arrangement drawings of various components of the control apparatus of FIG. 16a, showing exemplary dimensions associated therewith.

It will be recognized that the apparatus 1600 of FIG. 16 may also be configured in double-wide, triple-wide, etc. forms, such as where two display elements 1604 are juxtaposed within a common outer bezel and faceplate (not shown).

The controller apparatus may also include a chipset, SoC, or other such device including a radio frequency (RF) interface, such as those configured to comply with the well-known Bluetooth or IEEE-Std. 802-11 communication standards and protocols. In this capacity, the user's Bluetooth, etc. equipped cell phone, PDA, or other device can communicate with the control apparatus 1600 (and vice versa) so as to, inter alia, (i) reprogram its characteristics, such as displayed graphic images (e.g., "wallpaper"), (ii) change audio data/files stored therein (e.g., "ringtones" or sounds for when the device is actuated, or certain functions or events occur), and (iii) conduct testing and/or maintenance. In one exemplary embodiment, the user's cellular "smartphone" communicates with the control apparatus 1600 via the Bluetooth interface to download user wallpaper and/or ringtones that permit the user to customize the display and any audio functionality therein. For example, a new mother may desire to program the apparatus 1600 to show a picture of her newborn as "wallpaper" on the function display (and/or when the controller 1600 is dormant), or depending on the processing and storage capability of the control apparatus 1600, even a short video clip or animation. Similarly, the device (where so equipped) can be configured to play a short tune/ringtone or audio clip, such as the aforementioned newborn saying its first sounds or words. In this fashion, the controller(s) 1600 can be readily customized to the user's preferences via the wireless interface and the extant cellular telephone/PDA/computer capability.

Similarly, the controller 1600 can also be configured to retain and download information to the mobile or computerized device (e.g., PDA), such as a log file or history of use of the apparatus 1600 over a period of time, any stored data (e.g., from the notepad or similar functions previously described), or its current programmed settings. Myriad other possible types of data communication between the controller 1600 and an external computerized device via a wireless interface will also be recognized by those of ordinary skill in the arts provided the present disclosure.

Improved Controller Apparatus

Figure 18:
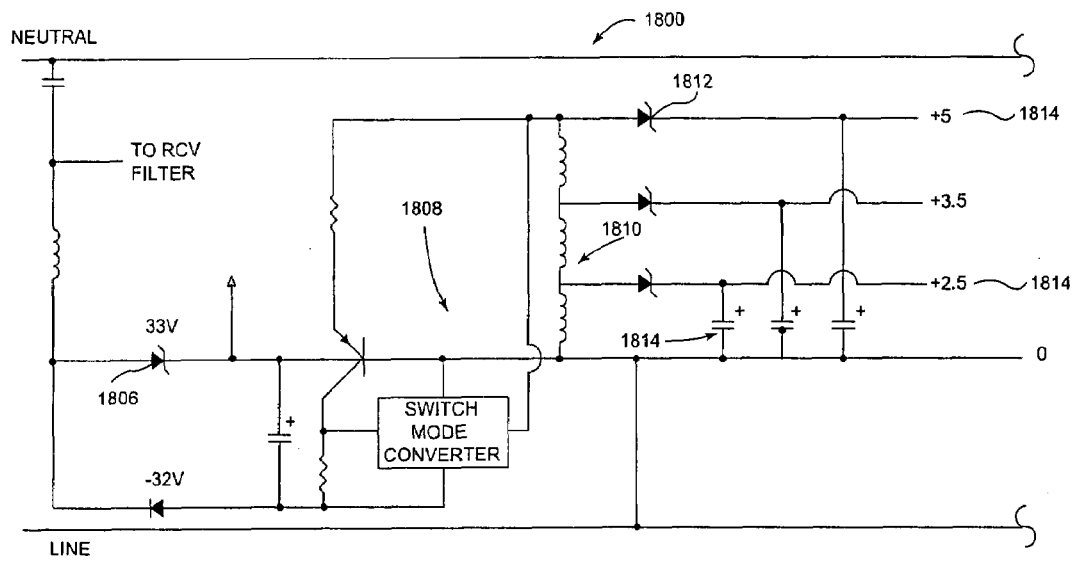
FIGS. 18-18b are schematics of alternate configurations of the power supply circuit of the controller of FIG. 17 comprising a high power multi-voltage off-line converter.

Referring now to FIGS. 17-18, an improved electronic controller apparatus is described in detail.

It will be recognized that while described in the context of an exemplary two-wire (e.g., "Line" and "Neutral") system used in, e.g., a or Universal Powerline Bus (UPB) application, the apparatus of FIGS. 17-18 can be readily adapted for use other applications and configurations. FIG. 17 is a schematic of one embodiment of an improved controller circuit (referenced to the line conductor) according to the invention. As shown, the exemplary apparatus 1700 of FIG. 17 comprises a simplified controller (e.g., UPB) located on the "Line" conductor 1702 rather than on the Neutral lead 1704, the latter common in the prior art. See, e.g., U.S. Pat. No. 6,734,784 to Lester issued May 11, 2004 entitled "Zero crossing based powerline pulse position modulated communication system" incorporated herein by reference in its entirety.

The circuit 1700 comprises a plurality (e.g., three) output triacs 1708, one or more satellite device (e.g., switch) control leads 1710, a plurality of associated satellite control filters 1712, a switch matrix 1714, current sensor 1716, voltage sense circuit 1718, simplified power supply 1720, UPB transmit circuit 1722, UPB receiver filter 1723, and controller device 1724.

In the illustrated embodiment, the controller device 1724 comprises a microcontroller of the type ubiquitous in the digital arts, although other types of devices (including for example a digital processor) may be used in place of or even in conjunction with the microcontroller shown. The controller 1724 includes, inter alia, a MUX (multiplexer) function which is used to interface with the switch matrix 1714 with respect to the "satellite" control signals (1,2, . . . n) transmitted over the control leads 1710.

Locating the controller on the Line conductor 1702 as in FIG. 17 has several advantages, including:

(i) the triacs 1708 can be driven directly by the controller 1724, and no opto-triac driver or similar mechanism is required. This feature is especially useful for multiple outputs; e.g., multiple outputs would have required a corresponding number of opto drivers under the prior art approach, thereby increasing the cost and complexity of the solution (and potentially impacting reliability);

(ii) the current sensing function can be accomplished with a small operational amplifier (op amp) 1726 and a few resistors rather than a large current transformer as under the prior art; and (iii) only a ground (one lead) is required for the satellite switch to control the module via the satellite leads 1710, rather than a line feed as in many prior art solutions.

Additionally, the embodiment of FIG. 1 illustrates other simplifications and improvements including the exemplary simplified power supply 1720. This circuit 1720 uses only two diodes, two capacitors, one inductor, and a regulator (U2). Diode D1 1730 clamps the voltage between the Zener Voltage (usually 9.1V) and −0.7V. Diode D2 1732 then charges C2 to Vz less 0.7V. U2 then regulates it down to +V (typically +5V). The illustrated power supply is suitable to 100 mA current, although it will be appreciated that other configurations and component values may be used to achieve a desired level of current performance.

The exemplary switch matrix 1714 shown requires one controller common pin plus 1 pin for each switch pair, or a total of 5 pins for 8 switches. To sense the switch status, the MUX pin 1730 of the controller 1724 is held "high" in order to sense all the "B" switches, and alternatively held "low" to sense all the "A" switches. Hence, in two tests, all the switches are advantageously determined with minimal process code on the controller 1724.

It is further noted that the circuit 1700 advantageously uses only one controller device 1724 pin to sense both an "up" switch, a "down" switch, as well as a remote "up" or "down" switch. This design is a very efficient way to generate an 8-button mux function using only 5 total logic pins.

The voltage sensing circuit 1718 combined with the current sensing circuit 1716 allows the controller to measure load power (P=V I Cos θ).

It will be recognized that a current transformer can also be used in place of the current sensor 1716, as well as other types of device including for example an integrated Hall effect device such as those provided by Allegro Microsystems Corp. of Worcester, Mass.

Additionally a miniature active 4$^{th}$ order filter can be used to replace the comparatively large receiver filter 1723 for miniature circuit requirements as needed. Such filters are well known to those of ordinary skill in the art, and hence are not described further herein.

To improve the receive pulse detection by the circuit 1700, the illustrated circuit design advantageously measures both the positive and negative energy using an analog/digital ("mixed signal") approach rather than a comparator as in the prior art. This mixed signal approach is simpler for the controller 1724 and requires less code. It also has the advantage of more precisely measuring the energies in the time slots to better determine valid pulse location, thereby improving accuracy. Bipolar pulse energy allows the processor to measure the periodic dimmer noise and subtract it from the inputs to detect UPB pulses more accurately.

The circuitry 1700 may further optionally comprise a temperature switched thermistor electrically attached to one or more of the triac heat sinks, as shown in FIG. 17. As previously noted, the purpose of these thermistors is to shut down or disable the triac driver should the triac's maximum acceptable temperature be reached, thereby protecting against overheating damage to the (e.g. dimmer) switch. Implementation of this embodiment is also a very low cost solution to prevent the accidental overheating of a light circuit through, e.g., use of a wattage above the maximum wattage design capabilities or recommendations. By placing the triacs centrally with respect to the heat sink(s), the thermal efficiency of the device as a whole is also increased.

In the illustrated embodiment, the thermistor 1750 ($R_{ts}$) is connected from common to a pin on the controller with a bias resistor $R_t$ 1752 connected from PTC thermistor to a desired voltage V+(e.g., +5V). As the temperature of the (PTC) thermistor 1750 reaches the switching temperature, the voltage at the PIC input exceeds the threshold voltage (1.3V in the illustrated example) of the PIC, momentarily switching off the triac until the temperature drops below the threshold temperature.

It will be noted that the values of $R_t$ 1752 and $R_{ts}$ 1750 can be reversed if desired, and the logic input altered to perform the same function. The time constant for the on/off cycling of the thermistor circuit is controlled substantially by the thermal characteristics of the thermal junction of the device; accordingly, the time constant characteristics can be controlled and altered as desired also.

Referring now to FIG. 18, an alternate embodiment (higher power) power supply circuit 1800 is described. In this embodiment, the circuit is adapted for multi-voltage higher power off-line conversion. By utilizing a higher voltage Zener diode 1806 (e.g., 33V) than that of the power supply 1720 of FIG. 17, and reversing polarities, a −32V supply is generated. Using a step-up positive regulator 1808 connected as a negative inverting converter, a simple low-cost tapped inductor 1810 and a diode 1812 and capacitor 1814 is used for each output 1814.

It will also be recognized that the controller 1724 of FIG. 17 may comprise a flash-memory equipped device which can be reprogrammed using any number of techniques known to those of ordinary skill in the art. For example, where it is desired to change the programming of the module without disassembly or replacement, the controller can have new code downloaded and installed via the embedded or flash memory of the controller, such as via a wired or wireless data interface (e.g., Bluetooth, 802.11a/g, or UWB). Similarly, the controller 1724 can be provisioned so as to store data (such as a log of settings, operations, transients, power consumption, etc) and transmit this data off-module to a remote device or network according to any one of a number of well known data communications protocols. This function may be useful, for example, in evaluating the user's energy usage patterns or habits.

Several unique aspects of the controller of the present invention will be recognized. Specifically, unlike the prior art (such as that of U.S. Pat. No. 6,734,784 referenced above), the controller of the present invention can separate a UPB transmitter from the resident output leads. Additionally, the controller can remember one or more previously invoked settings or programs (e.g., prescribed levels of dimming for one or more controlled lighting fixtures or systems). The satellite switch can also be field converted from one to two rockers (or color or other aesthetic changes made) using the same control or rocker modules.

Figure 18A:
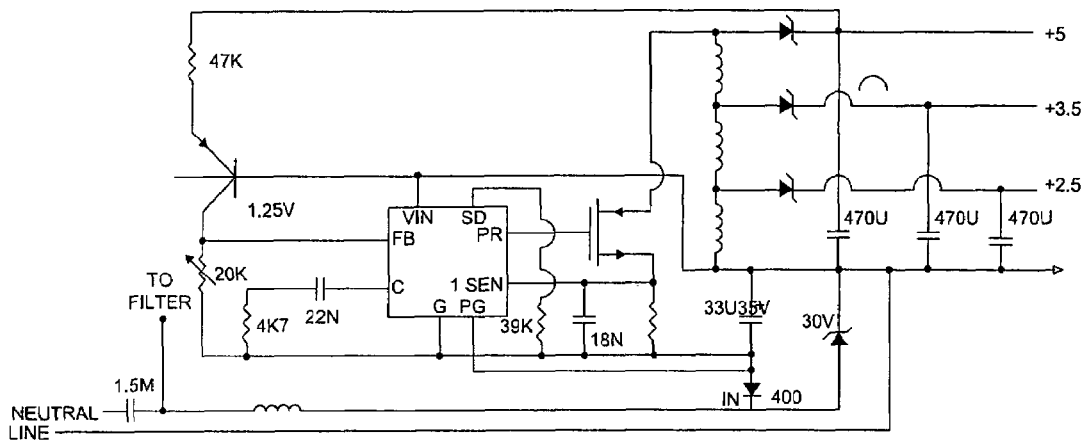
Figure 18B:
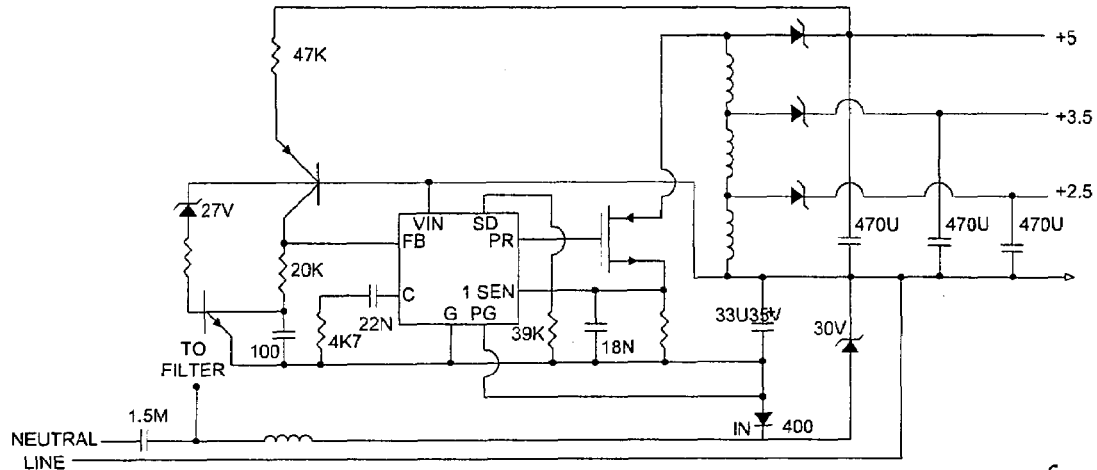

FIGS. 18a and 18b are yet other alternate embodiments, one with input voltage foldback.

As previously discussed with respect to FIG. 17, the "wired-in" modules of the present invention have a satellite wire or terminal which allows a low cost satellite control switch or other such component to control the module 102. This capability is extremely useful because a wired-in controller in, e.g., a light or wall fixture, can easily be put in the "program" mode by actuation of the low cost satellite switch which is always accessible to the premises resident or user.

Similarly, other more complex devices, such as a wired-in multi-speed (e.g., 3-speed) fan/lamp module, can also be completely controlled by the low cost passive satellite device (e.g., rocker switch). In one exemplary embodiment, the following control scheme is provided for the switch:

Tap top of rocker switch once to turn fan to lowest speed (1).

Tap top of rocker switch twice to turn fan to medium speed (2).

Tap top of rocker switch three times to turn fan to high speed (3).

Tap top of rocker switch four times to turn light on.

Tap bottom of rocker 1, or 2, or 3, or 4 times to turn each off.

Hold bottom of rocker depressed to progressively reduce light intensity (dim).

Hold top of rocker to raise light intensity.

For timer shut-off of fan and light (with desired one on), tap bottom rocker (off) 5, 6, or 7 times for shut-off of 30 minutes, 60 minutes, 120 minutes.

To put in program mode, tap top of rocker 5 times.

The wired-in fan with the satellite switch also makes it an easy retrofit for existing fans.

It will be appreciated that any number of different combinations of actions and functions can be implemented using the "satellite control" approach of the present invention, the foregoing control scheme being merely illustrative. For example, other types of satellite control device may be used to impart different or similar control signals (e.g., a quad rocker arrangement).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Electrical control apparatus comprising:
a control portion comprising at least one electrical circuit;
an actuator portion which is selectably separable from said control portion, said actuator portion being replaceable by a different actuator portion, said actuator portions comprising substantially no electrical components; and
wherein said different actuator portions are adapted to control different electrical functions, respectively.

2. The electrical control apparatus of claim 1, wherein said control portion is further adapted to interface with a modular sensor circuit.

3. The electrical control apparatus of claim 2, wherein said modular sensor circuit comprises an infrared sensor.

4. The electrical control apparatus of claim 2, wherein said modular sensor circuit comprises a motion detection sensor.

5. The electrical control apparatus of claim 1, wherein said actuator portion comprises a single rocker switch and said different actuator portion contains a plurality of rocker switches, said at least one electrical circuit comprising a plurality of circuits selectively controllable by respective ones of said plurality of rocker switches.

6. The electrical control apparatus of claim 1, wherein said control apparatus is in communication with an appliance through a power line distribution wiring of a premises, said communication comprising a communications protocol.

7. The electrical control apparatus of claim 6, wherein said communications protocol comprises the Universal Powerline Bus (UPB) protocol.

8. The electrical control apparatus of claim 1, wherein said at least one electrical circuit comprises a thermistor-based protection circuit adapted to protect said circuit against at least thermal overload conditions.

9. The electrical control apparatus of claim 1, wherein said control portion comprises a transistorized architecture having:
    at least one electronically controlled switching function;
    a mechanically actuated air gap;
    LED status indications; and
    a thermally optimized power transistor and heat sink configuration.

10. The electrical control apparatus of claim 1, further comprising a heat sink arrangement adapted to maintain substantially constant thermal power dissipation capability irrespective of whether only said control portion is utilized, or two or more of said control portions are aggregated within the same apparatus.

11. Control apparatus useful in controlling at least one premises function, comprising:
    a control module adapted to interface with a plurality of different configurations of control elements, said control module further comprising an electrical circuit adapted to perform a particular electrical function, said electrical function being determined at least in part by the particular one of said plurality of different configurations of control elements placed in removable communication with said module; and
    a removable control element in communication with said control module, wherein said control element comprises substantially no electrical components, yet is adapted to actuate at least a portion of said electrical circuit in order to perform said function.

12. The control apparatus of claim 11 further comprising a heat sink, said heat sink being in thermal communication with a junction box of said premises.

13. The control apparatus of claim 12 wherein said electrical circuit comprises a controller and a plurality of bidirectional switch devices, at least one of said plurality of bidirectional switch devices being substantially centrally positioned with respect to said heat sink.

14. The control apparatus of claim 11, wherein said control module further comprises a controller referenced to a line terminal in a premises power distribution wiring.

15. The control apparatus of claim 11, wherein said electrical circuit comprises a thermistor-based protection circuit adapted to protect said circuit against at least thermal overload conditions.

16. Control apparatus useful in controlling the operation of a plurality of appliances disposed at a premises, comprising:
    a control module, comprising:
        a housing adapted to be removably attached to a structure;
        at least one circuit electrically coupled to a power distribution wiring of said premises; and
    a plurality of control elements adapted for mating with said control module, each of said plurality of control elements replaceable by a different control element, the mating of one of said plurality of different control elements controlling an electrical function in said control module different than that of the other of said plurality of control elements, said plurality of control elements comprising substantially no electrical components.

17. The control apparatus of claim 16, wherein said control module is in electrical communication with at least one of said plurality of appliances via a communications protocol over said power distribution wiring.

18. The control apparatus of claim 17, wherein said communications protocol comprises the UPB protocol.

19. The control apparatus of claim 18, wherein at least one of said plurality of control elements comprises a rocker control element and said different control element is a pushbutton control element.

20. The control apparatus of claim 19, further comprising a modular sensor circuit adapted to interface with said control apparatus.

21. The control apparatus of claim 16, further comprising a faceplate, said faceplate adapted to dissipate locally generated thermal energy via at least one airflow channel.

22. The control apparatus of claim 16, wherein said apparatus is configured to visually indicate the selection of one or more of said plurality to a user without utilizing any electrical elements within said control elements.

23. The control apparatus of claim 22, wherein said visual indication is by at least one light-emitting diode (LED) disposed in said control module yet visible via or through at least one of said control elements.

24. An electrical control apparatus useful in the control of electrical devices, comprising:
    a control circuit comprising, an input circuit, a controller referenced to a line conductor and a plurality of bidirectional switch devices that are driven directly by said circuit;
    a control module, wherein said control circuit is mounted substantially within said module; and
    at least one control element adapted to provide a mechanical interface between a user and said input circuit without utilizing any electrical components therein.

25. The electrical control apparatus of claim 24, wherein said plurality of bidirectional switch devices comprise triac devices.

26. The electrical control apparatus of claim 24, wherein said control circuit further comprises at least one thermally switched electronic device proximate said plurality of bidirectional switch devices, said at least one thermally switched device adapted to protect against overheating of said control circuit.

27. The electrical control apparatus of claim 24, wherein said plurality of bidirectional switch devices are silicon controlled rectifiers (SCRs).

28. Control apparatus useful in controlling one or more premises functions, comprising:
- a control module having an electronic display, wherein said display further comprises a touch-control element;
- at least one interface disposed on said electronic display adapted to allow a user to selectively place at least one sensor element in signal communication with said control modules, said selective placement of said sensor element comprising inserting said sensor element into one or more apertures disposed on said display element; and
- an electronic controller in signal communication with said display module and said at least one sensor interface.

29. The control apparatus of claim 28, wherein said at least one sensor element is in direct electrical communication with said control module.

30. The control apparatus of claim 28, wherein said electronic display is a liquid crystal display (LCD).

31. The control apparatus of claim 28, wherein said control module is in electrical communication with an appliance via a premises power distribution wiring using a communications protocol.

32. The control apparatus of claim 28, wherein said touch control element comprises a capacitive touch screen panel.

33. The control apparatus of claim 28, further comprising a wireless interface circuit in signal communication with said electronic controller, said wireless interface adapted to permit the reception of wireless data from an external device, said wireless data being used to alter at least one aspect of the operation of said apparatus.

34. The control apparatus of claim 33, wherein said at least one aspect comprises an image displayed on said electronic display.

35. The control apparatus of claim 28, further comprising an audio circuit adapted to generate audible sounds.

36. The control apparatus of claim 33, further comprising an audio circuit adapted to generate audible sounds, and wherein said at least one aspect comprises the sounds emitted by said audio circuit.

37. A control apparatus useful in controlling one or more premises functions, comprising:
- at least one circuit-less control element adapted to interface with a control module; and
- a control module circuit disposed at least partially within said control module, said control module circuit further comprising:
  - a controller, said controller being referenced to a line conductor;
  - a switch matrix;
  - a current sensing circuit element;
  - a plurality of bidirectional switches; and
  - a power supply
  - wherein said controller is adapted to communicate with at least one appliance in a premises.

38. The control apparatus of claim 37, wherein said communication occurs over a predetermined communications protocol including both a transmit function and a receive function.

39. The control apparatus of claim 37, wherein said plurality of bidirectional switches comprise triac switches, said triac switches further being in thermal communication with at least one temperature-switched thermistor, said at least one thermistor adapted to prevent said control circuit from overheating.

40. The control apparatus of claim 39, further comprising a heat sink, said heat sink adapted to dissipate heat from said control module circuit.

41. The control apparatus of claim 37, wherein said control module circuit further comprises a plurality of actuator switches disposed in electrical communication with said control module circuit, at least a portion of said plurality of actuator switches in mechanical communication with said at least one control element.

42. An apparatus for removing heat from a premises control apparatus, comprising:
- a heat sink made of a thermally conductive material adapted to at least partially dissipate thermal energy through an electrical junction box; and
- a faceplate adapted to facilitate the rejection of a locally generated thermal energy, said faceplate further comprising an airflow channel defined by at least two surfaces;
- wherein said airflow channel dissipates said thermal energy passively to a surrounding ambient environment using a thermal driving head created by differential air density.

43. The apparatus of claim 42, wherein said thermally conductive material comprises an aluminum-containing material.

44. The apparatus of claim 42, wherein said faceplate comprises a screw-less faceplate formed from a polymer.

45. The apparatus of claim 42, wherein said faceplate is adapted to emit a thermally-activated aroma.

46. An apparatus for removing heat from a premises control apparatus, said apparatus adapted to control at least one electrical device disposed within or proximate to said premises, the apparatus comprising:
- a heat sink made of a thermally conductive material adapted to at least partially dissipate thermal energy through an electrical junction box; and
- a faceplate adapted to facilitate the rejection of said thermal energy, said faceplate further comprising an airflow channel defined by at least two surfaces;
- wherein said airflow channel dissipates said thermal energy to a surrounding ambient environment using a chimney effect created by differential air density.

* * * * *